United States Patent [19]

Terada et al.

[11] Patent Number: 5,119,219
[45] Date of Patent: Jun. 2, 1992

[54] LIQUID CRYSTAL APPARATUS AND CHIRAL SMECTIC LIQUID CRYSTAL COMPOSITION FOR USE THEREIN

[75] Inventors: Masahiro Terada, Atsugi; Masataka Yamashita, Hiratsuka; Shosei Mori, Atsugi; Shinichi Nakamura, Atsugi; Kenji Shinjo, Atsugi; Kazuharu Katagiri, Tama, all of Japan

[73] Assignee: Canon Kabushiki Kaisha, Tokyo, Japan

[21] Appl. No.: 543,415

[22] Filed: Jun. 26, 1990

[30] Foreign Application Priority Data

Jun. 30, 1989 [JP] Japan .................. 1-169422

[51] Int. Cl.⁵ .................................................. G02F 1/13
[52] U.S. Cl. .................................... 359/56; 359/104; 359/44; 340/784
[58] Field of Search ............. 350/339 T, 332, 333, 350/350 S, 350 R; 340/784, 765, 805, 784; 359/56, 104

[56] References Cited

U.S. PATENT DOCUMENTS

| | | | |
|---|---|---|---|
| 4,367,924 | 1/1983 | Clark et al. | 350/334 |
| 4,655,561 | 4/1987 | Kanbe et al. | 350/350 S |
| 4,763,992 | 8/1988 | Takada et al. | 350/331 T |
| 4,765,720 | 8/1988 | Toyono et al. | 350/333 |
| 4,770,502 | 9/1988 | Kitazima et al. | 350/333 |
| 4,778,260 | 10/1988 | Okada et al. | 350/332 |
| 4,927,243 | 5/1990 | Taniguchi et al. | 350/333 |
| 4,932,759 | 6/1990 | Toyono et al. | 350/333 |
| 4,958,915 | 9/1990 | Okada et al. | 350/333 |

FOREIGN PATENT DOCUMENTS 56-107217 8/1981 Japan .
2156131 10/1985 United Kingdom .

OTHER PUBLICATIONS

Journal of Applied Physics, vol. 22, No. 10, Oct. 1983, pp. 661-663, Miyasato, K., et al., "Direct Method With Triangular Waves for Measuring Spontaneous Polarization in Ferroelectric Liquid Crystals".

Applied Physics Letters, vol. 18, No. 4, Feb. 15, 1971, pp. 127-128, Schadt, M., et al., "Voltage-Dependent Optical Activity of a Twisted Nematic Liquid Crystal".

Primary Examiner—Rolf Hille
Assistant Examiner—Tan Ho
Attorney, Agent, or Firm—Fitzpatrick, Cella, Harper & Scinto

[57] ABSTRACT

A liquid crystal apparatus includes a chiral smectic liquid crystal showing a first and a second orientation state disposed between first and second electrodes of a liquid cell. A drive circuit applies voltages between the first and second electrodes including voltages $|V_S|$ and $|V_I|$ which provide voltages $V_A$ and $V_B$ ($V_B V_A$) satisfying the relationship of: $|(V_A - V_B)/(V_A + V_B)| > 0.1$ at 40° C. $V_A$ is a minimum peak value of a voltage $|V_S| + |V_I|$ (at a constant pulse width) capable of inverting the first orientation state of the chiral smectic liquid crystal into the second orientation state when a voltage pulse is applied between the first and second electrodes to cause the first orientation state of the chiral smectic liquid crystal and then the voltage $|V_S| + |V_I|$ is applied between the first and second electrodes as a combination of a voltage $|V_S|$ applied to the first electrode and a voltage $-V_I|$ applied to the second electrode. $V_B$ is a value of $|V_S| + |V_I|$ calculated based on a maximum peak value of a voltage $|V_S| - |V_I|$ capable of maintaining the first orientation state of the chiral smectic liquid crystal when a voltage pulse is applied between the first and second electrodes to cause the first orientation state and then the voltage $|V_S| - |V_I|$ is applied between the first and second electrodes as a combination of a voltage $|V_S|$ applied to the first electrode and a voltage $|V_I|$ applied to the second electrode.

29 Claims, 10 Drawing Sheets

LIQUID CRYSTAL APPARATUS AND CHIRAL SMECTIC LIQUID CRYSTAL COMPOSITION FOR USE THEREIN

FIELD OF THE INVENTION AND RELATED ART

The present invention relates to a liquid crystal display apparatus using a ferroelectric liquid crystal composition, particularly a liquid crystal apparatus which can be driven at a particular duty ratio having a high frequency.

Hitherto, liquid crystal devices have been used as an electro-optical device in various fields. Most liquid crystal devices which have been put into practice use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

These devices are based on the dielectric alignment effect of a liquid crystal and utilize an effect that the average molecular axis direction is directed to a specific direction in response to an applied electric field because of the dielectric anisotropy of liquid crystal molecules. It is said that the limit of response speed is in the order of milli-seconds, which is too slow for many uses. On the other hand, a simple matrix system of driving is most promising for application to a large-area flat display in view of cost, productivity, etc., in combination. In the simple matrix system, an electrode arrangement wherein scanning electrodes and signal or data electrodes are arranged in a matrix, and for driving, a multiplex driving scheme is adopted wherein an address signal is sequentially, periodically and selectively applied to the scanning electrodes and prescribed data signals are selectively applied in parallel to the signal electrodes in synchronism with the address signal.

When the above-mentioned TN-type liquid crystal is used in a device of such a driving system, a certain electric field is applied to regions where a scanning electrode is selected and signal electrodes are not selected or regions where a scanning electrode is not selected and a signal electrode is selected (which regions are so called "half-selected points"). If the difference between a voltage applied to the selected points and a voltage applied to the half-selected points is sufficiently large, and a voltage threshold level required for allowing liquid crystal molecules to be aligned or oriented perpendicular to an electric field is set to a value therebetween, display devices normally operate. However, in fact, as the number (N) of scanning lines increases, a time (duty ratio) during which an effective electric field is applied to one selected point when a whole image area (corresponding to one frame) is scanned decreases with a ratio of 1/N. Accordingly, the larger the number of scanning lines are, the smaller is the voltage difference of an effective value applied to a selected point and non-selected points when scanning is repeatedly effected. This leads to unavoidable drawbacks of lowering of image contrast or occurrence of interference or crosstalk. These phenomena are regarded as essentially unavoidable problems appearing when a liquid crystal having no bistability (i.e. liquid crystal molecules are horizontally oriented with respect to the electrode surface as a stable state and is vertically oriented with respect to the electrode surface only when an electric field is effectively applied) is driven (i.e. repeatedly scanned) by making use of a time storage effect. To overcome these drawbacks, the voltage-averaging method, the two-frequency driving method, the multiple matrix method, etc. have been already proposed. However, none of the above-mentioned methods is sufficient to overcome the above-mentioned drawbacks. As a result, it is the present state that the development of large image area or high packaging density in respect to display elements is delayed because it is difficult to sufficiently increase the number of scanning lines (about 400 lines being considered as the upper limit).

To overcome drawbacks with such prior art liquid crystal devices, the use of liquid crystal devices having bistability has been proposed by Clark and Lagerwall (e.g. Japanese Laid-Open Patent Appln. No. 56-107216, U.S. Pat. No. 4,367,924, etc.). In this instance, as the liquid crystals having bistability, ferroelectric liquid crystals having chiral smectic C-phase (SmC*) or H-phase (SmH*) are generally used. These liquid crystals have bistable states of first and second stable states with respect to an electric field applied thereto. Accordingly, as different from optical modulation devices in which the above-mentioned TN-type liquid crystals are used, the bistable liquid crystal molecules are oriented to first and second optically stable states with respect to one and the other electric field vectors, respectively. Further, this type of liquid crystal has a property (bistability) of assuming either one of the two stable states in response to an applied electric field and retaining the resultant state in the absence of an electric field.

In addition to the above-described characteristic of showing bistability, such a ferroelectric liquid crystal (hereinafter sometimes abbreviated as "FLC") has an excellent property, i.e., a high-speed responsiveness. This is because the spontaneous polarization of the ferroelectric liquid crystal and an applied electric field directly interact with each other to induce transition of orientation states. The resultant response speed is faster than the response speed due to the interaction between dielectric anisotropy and an electric field by 3 to 4 digits.

Thus, a ferroelectric liquid crystal potentially has very excellent characteristics, and by making use of these properties, it is possible to provide essential improvements to many of the above-mentioned problems with the conventional TN-type devices. Particularly, the application to a high-speed optical shutter and a display of a high density and a large picture is expected.

However, a ferroelectric liquid crystal device has a problem that it shows a smaller drive margin on a high temperature side in a temperature range showing chiral smectic C phase than on a low temperature side. More specifically, when a device is driven at a voltage value which has been set so as to effect a drive on a high temperature side (at a constant pulse duration), it becomes difficult to effect an appropriate drive if the liquid crystal temperature is changed to a further higher temperature. Particularly, in case of a multiplex driving for writing in pixels on a selected scanning line depending on given data wherein the pixels on the scanning line are supplied with a voltage for resetting the pixels simultaneously into a black (or white) state and then only a selected pixel is supplied with a voltage for switching the pixel inversely into a white (or black) state, there is encountered a problem that a drive margin represented by the formula $|(V_A - V_B)/(V_A + V_B)|$ becomes smaller at a higher temperature side in the chiral smectic region, wherein $V_A$ denotes a minimum amplitude (at a given pulse duration) for causing the inverse switching and $V_B$ denotes a maximum amplitude (at the given pulse duration) sufficient for holding the resultant state after the resetting, as will be defined in more detail hereinafter.

SUMMARY OF THE INVENTION

An object of the present invention is to provide a liquid crystal apparatus showing a good rewriting speed and having a response speed and a drive margin which are sufficient to provide good images even at a high temperature of 50° C. or above.

According to the present invention, there is provided a liquid crystal apparatus, comprising:

a liquid crystal cell comprising a pair of substrates having thereon a first electrode and a second electrode, respectively, disposed opposite to each other, and a chiral smectic liquid crystal showing a first and a second orientation state disposed between the first and second electrodes, and a drive circuit for applying voltages between the first and second electrodes including voltages $|V_S|$ and $|V_I|$ which provide voltages $V_A$ and $V_B$ ($V_B > V_A$) satisfying the relationship of:

$$(V_A - V_B)/(V_A - V_B) > 0.1$$

at 40° C., wherein $V_A$ is a minimum peak value of a voltage $|V_S| + |V_I|$ (at a constant pulse width) capable of inverting the first orientation state of the chiral smectic liquid crystal into the second orientation state when a voltage pulse is applied between the first and second electrodes to cause the first orientation state of the chiral smectic liquid crystal and then the voltage $|V_S| + |V_I|$ is applied between the first and second electrodes as a combination of a voltage $|V_S|$ applied to the first electrode and a voltage $-|V_I|$ applied to the second electrode; and $V_B$ is a value of $|V_S| + |V_I|$ calculated based on a maximum peak value of a voltage $|V_S| - |V_I|$ (at a constant pulse width) capable of maintaining the first orientation state of the chiral smectic liquid crystal when a voltage pulse is applied between the first and second electrodes to cause the first orientation state and then the voltage $|V_S| - |V_I|$ is applied between the first and second electrodes as a combination of a voltage $|V_S|$ applied to the first electrode and a voltage $|V_I|$ applied to the second electrode.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
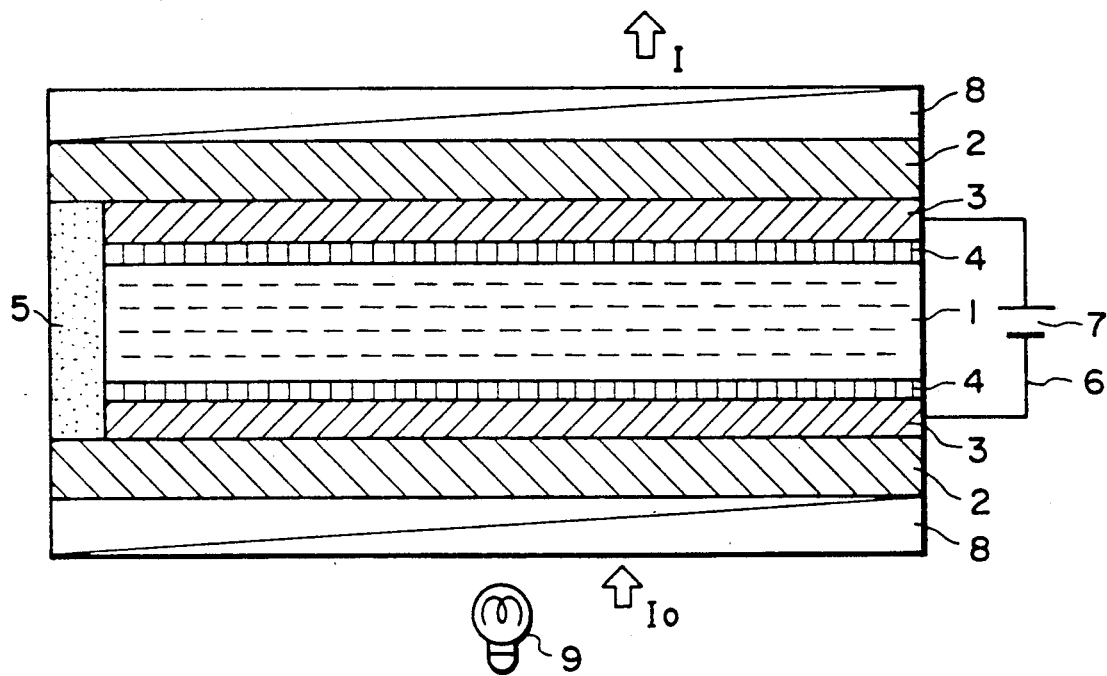
FIG. 1 is a schematic cross-sectional view of a liquid crystal display device using a ferroelectric liquid crystal.

FIG. 1 is a schematic sectional view of a liquid crystal device (cell) comprising a layer of a ferroelectric liquid crystal (chiral smectic liquid crystal) 1 disposed between a pair of glass substrates 2 each having thereon a transparent electrode 3 and an insulating alignment control layer 4. Lead wires 6 are connected to the electrodes so as to apply a driving voltage to the liquid crystal layer 1 from a power supply 7. Outside the substrates 2, a pair of polarizers 8 are disposed so as to modulate incident light $I_0$ from a light source 9 in cooperation with the liquid crystal 1 to provide modulated light I.

Each of two glass substrates 2 is coated with a transparent electrode 3 comprising a film of $In_2O_3$, $SnO_2$ or ITO (indium-tin-oxide) to form an electrode plate. Further thereon, an insulating alignment control layer 4 is formed by rubbing a film of a polymer such as polyimide with gauze or acetate fiber-planted cloth so as to align the liquid crystal molecules in the rubbing direction. Further, it is also possible to compose the alignment control layer of two layers, e.g., by first forming an insulating layer of an inorganic material, such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, or magnesium fluoride, and forming thereon an alignment control layer of an organic insulating material, such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, or photoresist resin. Alternatively, it is also possible to use a single layer of inorganic insulating alignment control layer or organic insulating alignment control layer. An inorganic insulating alignment control layer may be formed by vapor deposition, while an organic insulating alignment control layer may be formed by applying a solution of an organic insulating material or a precursor thereof in a concentration of 0.1 to 20 wt. %, preferably 0.2-10 wt. %, by spinner coating, dip coating, screen printing, spray coating or roller coating, followed by curing or hardening under prescribed hardening condition (e.g., by heating). The insulating alignment control layer may have a thickness of ordinarily 30 Å-1 micron, preferably 30-3000 Å, further preferably 50-1000 Å. The two glass substrates 2 with transparent electrodes 3 (which may be inclusively referred to herein as "electrode plates") and further with insulating alignment control layers 4 thereof are held to have a prescribed (but arbitrary) gap with a spacer 5. For example, such a cell structure with a prescribed gap may be formed by sandwiching spacers of silica beads or alumina beads having a prescribed diameter with two glass plates, and then sealing the periphery thereof with, e.g., an epoxy adhesive. Alternatively, a polymer film or glass fiber may also be used as a spacer. Between the two glass plates, a ferroelectric liquid crystal is sealed up to provide a ferroelectric liquid crystal layer 1 in a thickness of generally 0.5 to 20 microns, preferably 1 to 5 microns.

The transparent electrodes 3 are connected to the external power supply 7 through the lead wires 6. Further, outside the glass substrates 2, polarizers 8 are applied. The device shown in FIG. 1 is of a transmission type and is provided with a light source 9.

Figure 2:
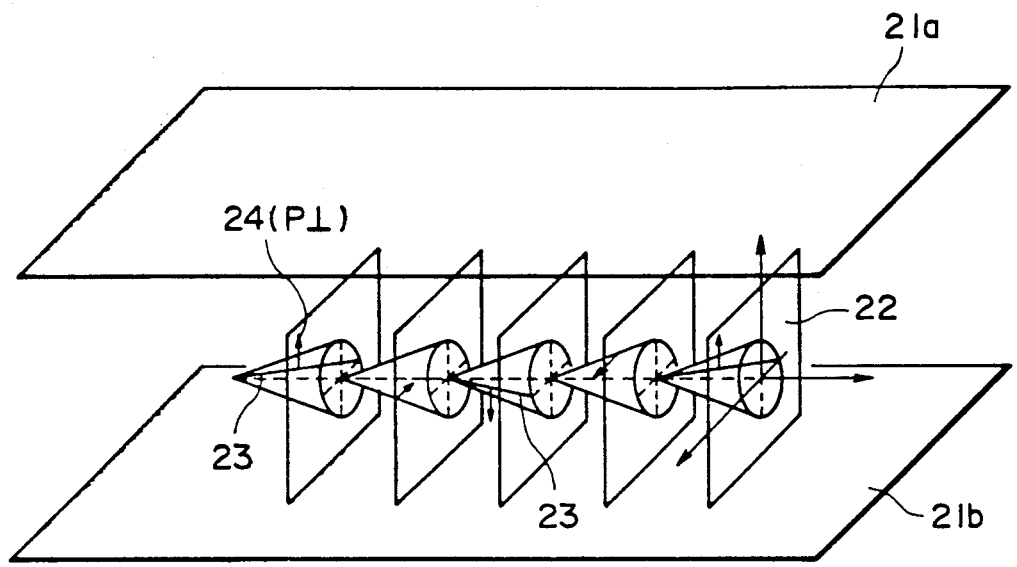
FIGS. 2 and 3 are schematic perspective views of a device cell embodiment for illustrating the operation principle of a ferroelectric liquid crystal device.

FIG. 2 is a schematic illustration of a ferroelectric liquid crystal cell (device) for explaining operation thereof. Reference numerals 21a and 21b denote substrates (glass plates) on which a transparent electrode of, e.g., $In_2O_3$, $SnO_2$, ITO (indium-tin-oxide), etc., and an above-mentioned alignment control layer subjected to a uniaxial aligning treatment are disposed, respectively, so that the alignment directions applied to the substrates are parallel to each other. A liquid crystal of an SmC*-phase (chiral smectic C phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moments (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
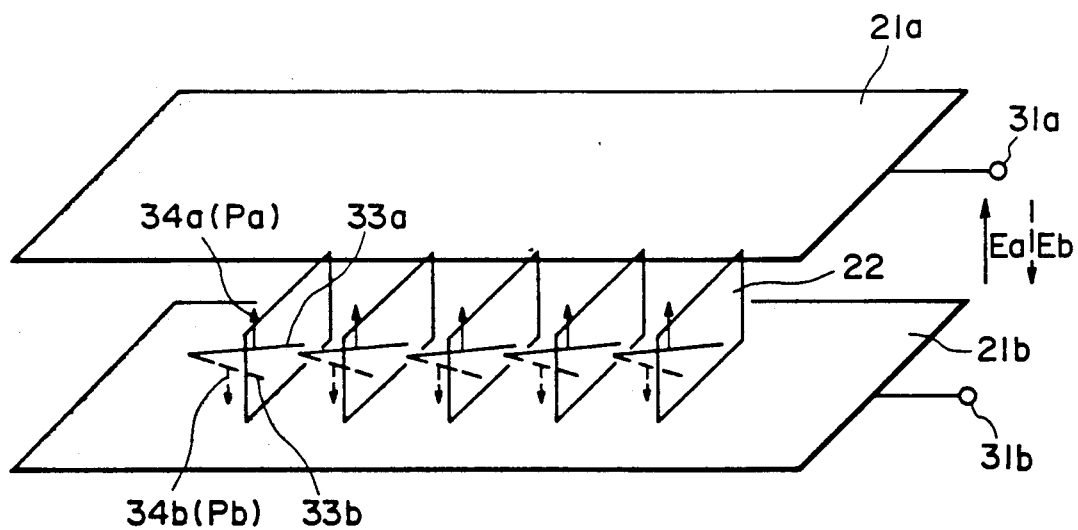

Further, when the liquid crystal cell is made sufficiently thin (e.g., less than about 10 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

When such a ferroelectric liquid crystal device comprising a ferroelectric liquid crystal composition as described above between a pair of electrode plates is constituted as a simple matrix display device, the device may be driven by a driving method as disclosed in U.S. Pat. No. 4,655,561, GB 2156131, etc.

Figure 4A:
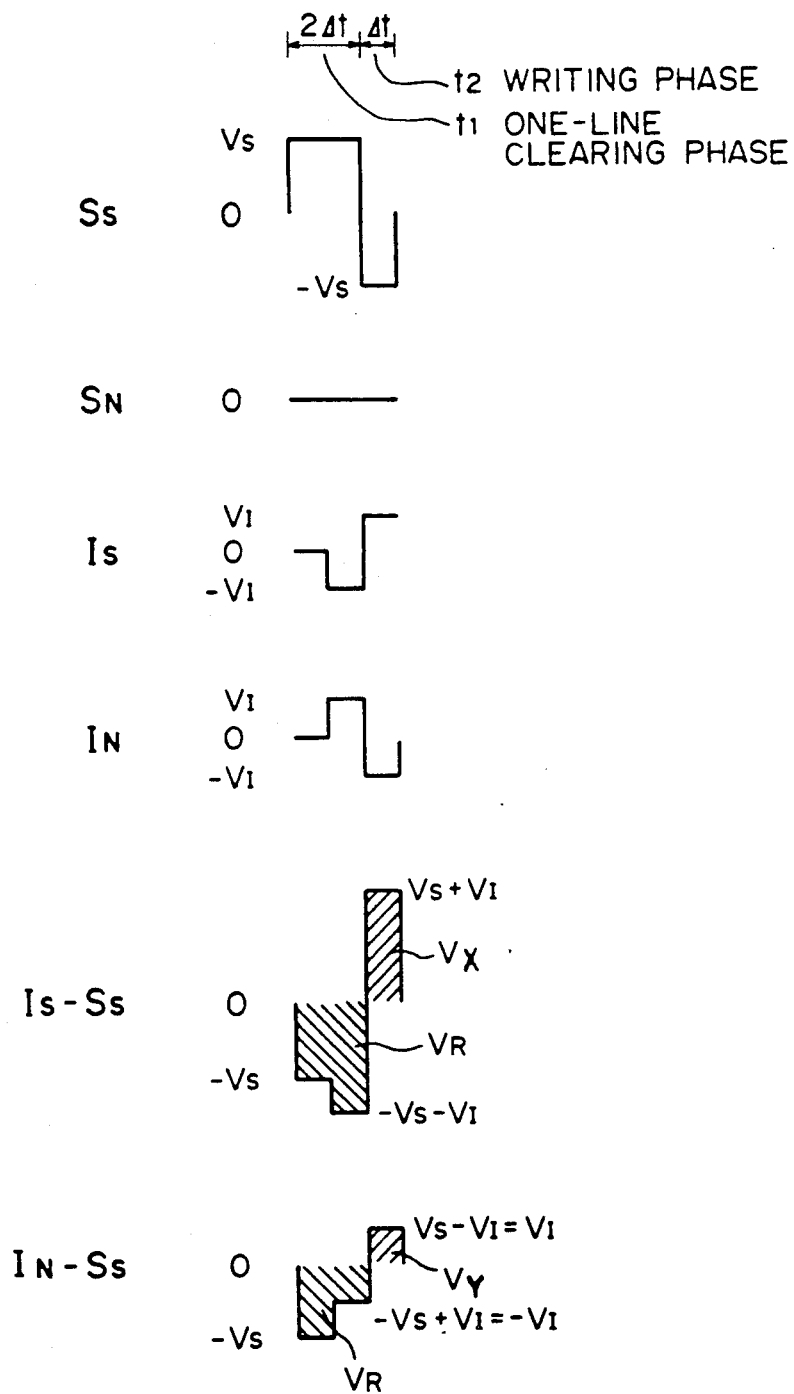
FIG. 4A shows unit driving waveforms used in an embodiment of the present invention.
Figure 4B:
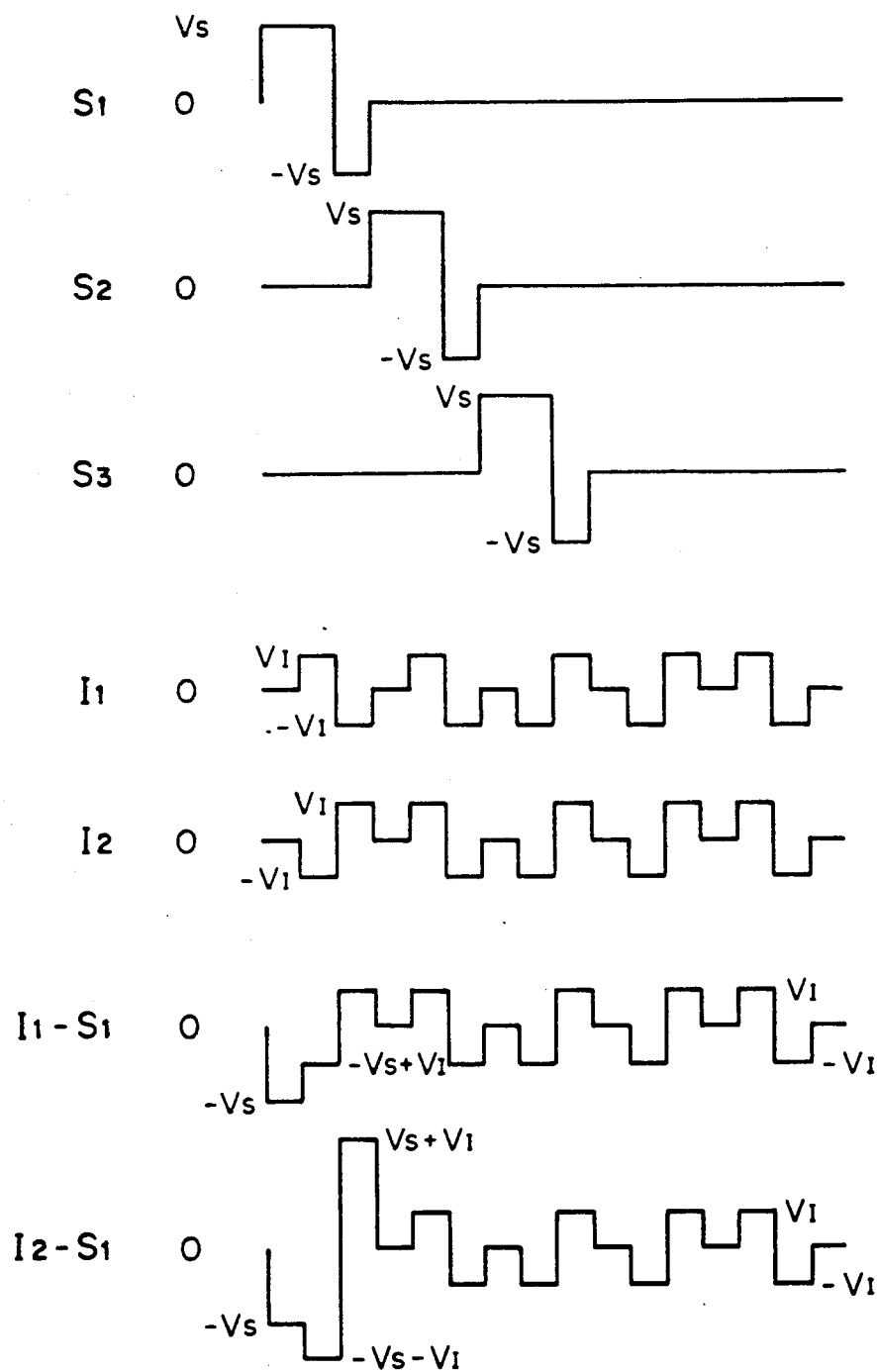
FIG. 4B is time-serial waveforms comprising a succession of such unit waveforms.
Figure 5:
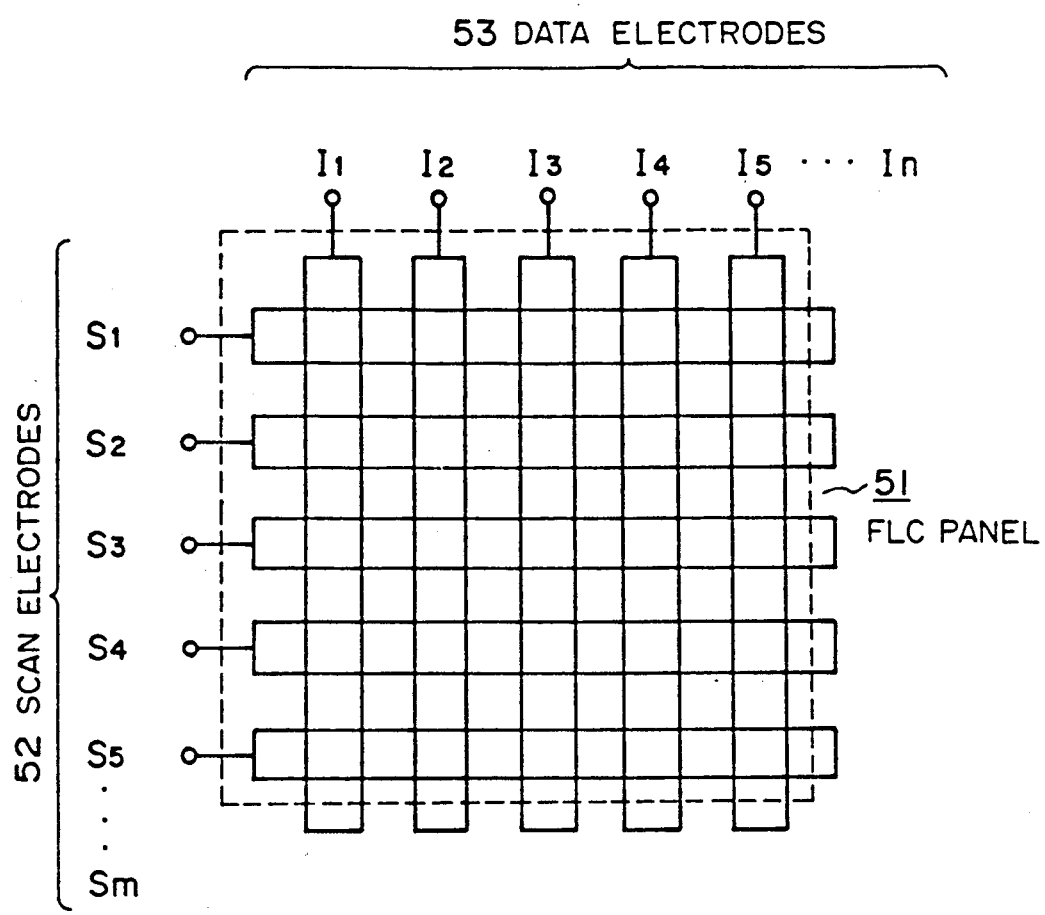
FIG. 5 is a plan view of a ferroelectric liquid crystal panel having a matrix electrode structure.
Figure 6:
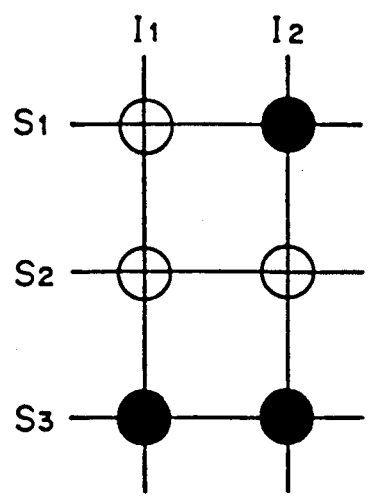
FIG. 6 is an illustration of a display pattern obtained by an actual drive using the time-serial waveforms shown in FIG. 4B.

FIGS. 4A and 4B are waveform diagrams showing driving voltage waveforms for measuring $V_A$ and $V_B$ from which the above-mentioned drive margin is derived. FIG. 5 is a plan view of such a ferroelectric liquid crystal panel 51 having a matrix electrode structure. Referring to FIG. 5, the panel 51 comprises scanning lines 52 and data lines 53 intersecting with the scanning lines. Each depending on switching characteristics of a ferroelectric liquid crystal material used.

In this embodiment, $V_A$ may be obtained by applying a voltage waveform shown at $I_S-S_S$ in FIG. 4A to a pixel whereby the pixel is reset to a first optical state by application of a voltage $V_R$ and then inverted to a second optical state by application of a voltage $V_X$ ($=V_S+V_I$). $V_A$ is defined as a minimum value of the voltage $V_S+V_I$ capable of causing the optical inversion while the voltages $V_S$ and $V_I$ are changed. (The voltage $V_S$ and $V_I$ are generally defined with respect to the potential level of a scanning electrode when the electrode is not supplied with a scanning selection signal.) On the other hand, $V_B$ may be obtained by applying a voltage waveform shown at $I_N-S_S$ in FIG. 4A to a pixel whereby the pixel is reset to a first optical state by application of a voltage $V_R$ and held at the first optical state under application of a voltage $V_Y(=V_S-V_I)$. $V_B$ is defined as a value $|V_S+V_I|$ based on voltage values $V_S$ and $V_I$ giving a maximum voltage $V_Y(=V_S-V_I)$ beyond which the pixel is inverted from the first optical state to a second optical state while the voltages $V_S$ and $V_I$ are changed. For example, $V_A$ and $V_B$ may be obtained by using a fixed pulse duration of $\Delta t=50$ μsec and a fixed bias ratio of $V_I/(V_I+V_S)=\frac{1}{3}$.

The threshold characteristics of a ferroelectric liquid crystal are strongly affected by an ambient temperature. For this reason, the value of drive margin Md is affected by an ambient temperature and becomes smaller on a higher temperature side in the chiral smectic phase. In the case of a small drive margin Md, particularly the case of Md<0.1, a uniform display on a large panel (e.g., a size of JIS A4) could not be achieved according to our experimental study because a larger panel is accompanied with a larger fluctuation in cell gap for pixels over the panel which leads to a larger fluctuation in threshold characteristic of pixels.

Further, in order to achieve a high-rewriting speed display (high-frequency drive), a high-speed responsiveness is of course required.

Among a response time $\tau$, the magnitude of spontaneous polarization $P_S$ and viscosity $\eta$, the following relationship exists: $\tau = \eta/(P_S \cdot E)$, where E is an applied voltage. Accordingly, a large response speed can be obtained by (a) increasing the spontaneous polarization, (b) lowering the viscosity $\eta$, or (c) increasing the applied voltage. However, the driving voltage has a certain upper limit in view of driving with IC, etc., which may be Vpp of about 30 volts, so that the drive voltage $V_S + V_I$ should also be suppressed to 30 volts or less. Accordingly, it is actually necessary to lower the viscosity or increase the spontaneous polarization.

A ferroelectric chiral smectic liquid crystal having a large spontaneous polarization generally provides a large internal electric field in a cell given by the spontaneous polarization and is liable to pose many constraints on the device construction giving bistability.

According to our study, it is necessary that a frame frequency $F_f$ is 20 Hz or higher in order to achieve a good rewriting speed. This means a one-scanning line writing time (1H) of 125 μsec or less ($\Delta t \leq 41.6$ μsec in a set of driving waveforms shown in FIG. 4A) if the number of scanning lines is assumed to be 400. In order to lower the temperature range satisfying such a responsiveness at least to room temperature, it is necessary that a liquid crystal composition is provided with $P_S$ which is large to some extent. According to our extensive study, however, such an increase in $P_S$ tends to cause a failure in realization of bistability and also a decrease in drive margin Md. This tendency has also been confirmed in cell structures where bistability is less affected by an increase in $P_S$, more specifically in a cell structure wherein a very thin polyimide film of about 50 Å is directly formed and rubbed on a transparent electrode (ITO) without forming an intermediate insulating layer and in a cell structure wherein ITO is directly rubbed.

For the above reason, in order to obtain a liquid crystal material showing an increased responsiveness, it is effective to use a large proportion of a compound showing a lowest viscosity as possible (e.g., a compound having a phenylpyrimidine skeleton) so as to provide an appropriate liquid crystal phase transition pattern (e.g., SmC*←→SmA←→Ch←→Iso; SmC*: chiral smectic phase, SmA: smectic A phase, Ch: cholesteric phase) and to add a compound having a large spontaneous polarization (e.g., a compound having an asymmetric carbon atom to which a fluorine atom is directly attached) as a $P_S$-imparting component so as to adjust the value of $P_S$ to an upper limit capable of avoiding a remarkable decrease in drive margin by controlling the addition amount of the $P_S$-adjusting component.

Further, if it is assumed that a display is actually used in a temperature range of about 5-45° C., the display should be actually operable at 50-55° C. or higher on the high temperature side because an additional heat is given by a drive system and a backlight.

However, the drive margin Md generally tends to decrease on the high temperature side and remarkably decrease within 10° C. from $T_C$ (upper limit of chiral smectic range). For this reason, the $T_{CA}$ (SmC*←→SmA transition temperature) of a liquid crystal composition should be set in consideration of the temperature range of use and particularly of the ensurement of an appropriate drive margin.

A serious problem on the low temperature side is a deterioration of responsiveness and a difference in response speed between 5-50° C. amounts to about ten times even for a chiral smectic composition having an excellent temperature characteristic (small temperature-dependence). Accordingly, it is difficult to compensate for the temperature-dependence only by adjustment of drive voltages while retaining a good rewriting speed (frame frequency $F_f \geq 20$ Hz) for display device.

For the above reason, it has been proposed to provide a liquid crystal device with a heat application means for the purpose of compensating for a steep temperature dependence below room temperature. In this case, however, there arises a tendency that an increased temperature difference develops over the extension of the device, so that a larger drive margin is required. Especially, the drive margin on the high temperature side poses a most important problem.

On the other hand, we have also tried to increase the frame frequency of a display device by changing the drive waveform from one providing a one-line scanning time (1H) composed of 3Δt as shown in FIG. 4A or by scanning two or more scanning lines simultaneously. In most cases, however, the drive margin Md is decreased, so that it is necessary to ensure a large drive margin Md of a liquid crystal material.

Further, a ferroelectric liquid crystal material is required to provide a monodomain state showing a uniform alignment characteristic so as to obtain a good image quality. The ferroelectric liquid crystal may desirably have a phase transition series of Iso (isotropic phase)—Ch (cholesteric phase)—SmA (smectic A phase)—SmC* (chiral smectic phase).

Liquid crystal materials (compositions) usable in the present invention may include the following mesomorphic compounds:

(1) Mesomorphic compounds having a skeleton including two rings connected with a single bond as shown below, which show a low viscosity and are advantageous for a high speed drive at a low temperature:

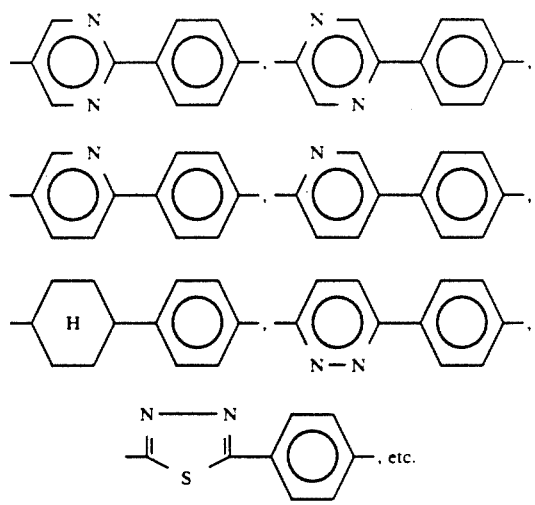

(2) Optically active mesomorphic compounds having large $P_S$ (and preferably also a low viscosity) including a group as shown below, which may be added in a small proportion as a $P_S$-imparting component to control the $P_S$ of the resultant liquid crystal composition as a whole:

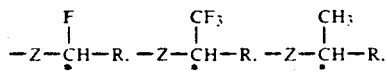

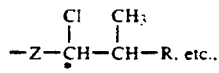

wherein Z: a bonding group with a cyclic skeleton, R: an arbitrary alkyl group, and C*: an optically active asymmetric carbon atom.

(3) Mesomorphic compounds providing an increased $T_{CA}$ without remarkably increasing the viscosity of the liquid crystal composition, thus being advantageous for high-temperature and high-speed drive, which may include:

mesomorphic compounds having a three-ring skeleton wherein three arbitrarily selected rings, such as:

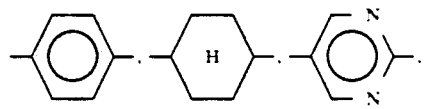

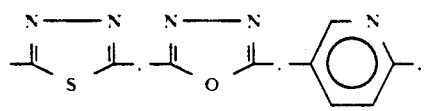

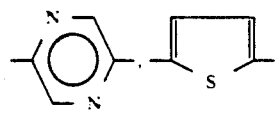

are respectively connected with a single bond. Examples of the three-ring skeleton may include:

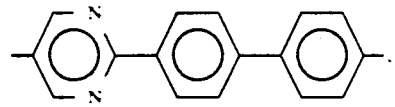

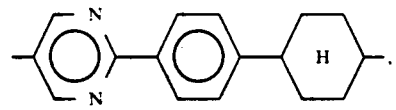

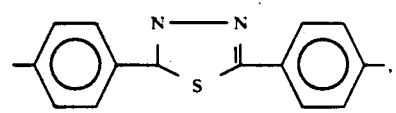

etc.;

mesomorphic compounds having a three-ring skeleton wherein a two-ring structure, such as a phenyl-pyrimidine ring, including two rings connected with a single bond, is connected to another ring, such as phenyl ring and cyclohexane ring with a connecting group, such as:

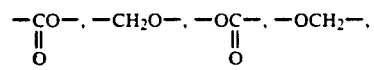

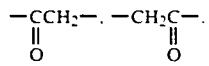

Examples of the three-ring skeleton may include:

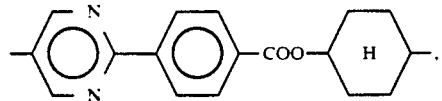

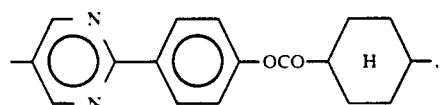

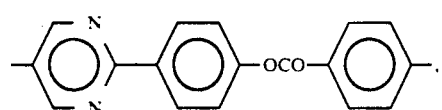

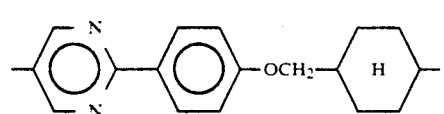

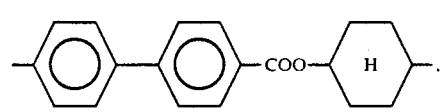

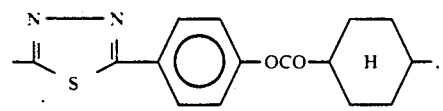

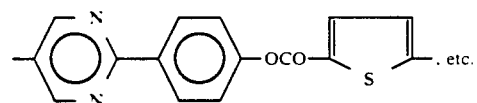

mesomorphic compounds having a two-ring skeleton but still providing a high SmC* phase upper limit temperature of 70° C. or higher, such as those having a skeleton as shown below:

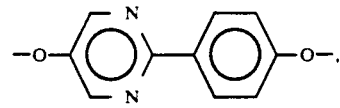

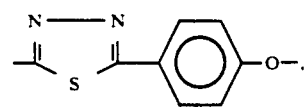

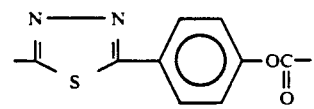

(4) Mesomorphic compounds for ensuring a lower temperature side of SmC* phase (lowering the melting point) or for adjustment of a phase transition series, having a skeleton as shown below:

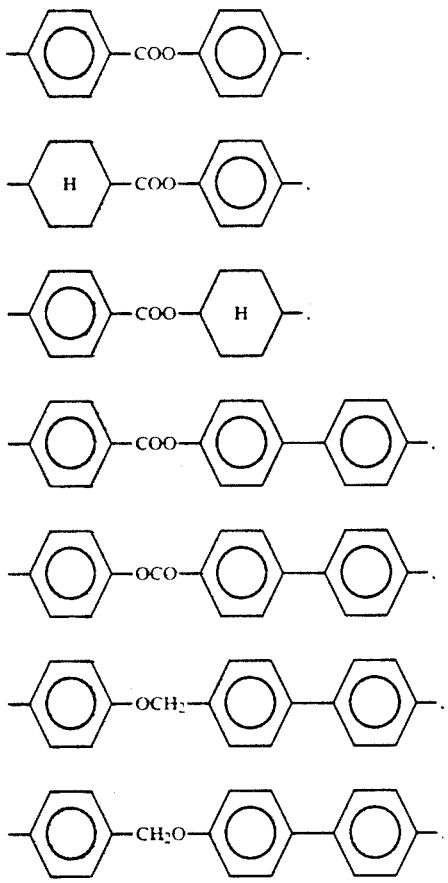

Further, it is necessary to appropriately select factors regarding the above classes (1)-(4) of mesomorphic compounds, such as the length of side chains, kinds of connecting groups with the skeletons, the presence or absence of a branch or substituent, and the presence or absence or position of a substituent in the skeletons in view of the influences thereof on the resultant ferroelectric liquid crystal composition, such as $P_S$-imparting characteristic, increase or decrease in viscosity, phase transition pattern, temperature region of Ch phase or SmA phase, and chemical stability.

Hereinbelow, the present invention will be explained in more detail based on Examples. It is however to be understood that the present invention is not restricted to the Examples. In the Examples, in order to evaluate a drive margin characteristic of a liquid crystal material, a voltage margin $\Delta V$ ($=V_B-V_A$) was measured by using a certain driving waveform with a fixed $\Delta t$ at a temperature, and the above-mentioned drive margin Md was obtained as a parameter in resistance to fluctuation in cell gap. If it is assumed that $V_A=10$ volts and $V_B=15$ volts were measured to provide Md=0.2, this means that the drive margin Md allows a cell gap of ±20% over the extension of the cell. In the present invention, Md>0.1 may suitably be set.

Further, a drive temperature margin Mt (±x °C.) may be measured as a temperature difference (range) allowing a drive (i.e., not causing switching failure on an entire panel) while setting drive voltages ($V_S$ and $V_I$) so as to satisfy $V_S+V_I=\frac{1}{2}(V_A+V_B)$ and changing the drive temperature. The drive margin characteristic of an liquid crystal apparatus can be more exactly evaluated based on both Md and Mt.

According to our study, it has been found difficult to maintain a good image display over a panel of a certain size (e.g., a size of 10 inches) or larger unless the condition of Md>0.1 is satisfied.

Figure 9:
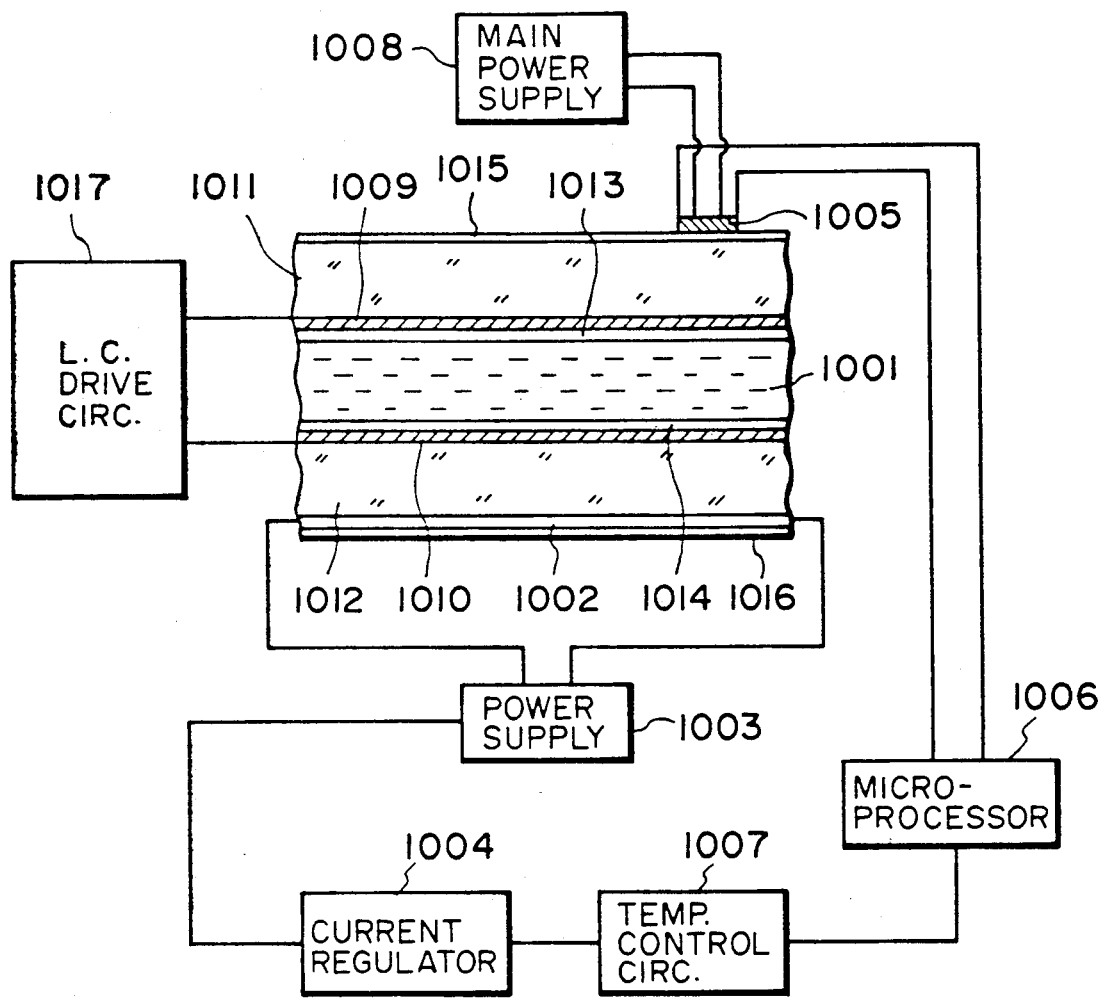
FIG. 9 is a block diagram showing an embodiment of the liquid crystal device according to the invention.

FIG. 9 shows an apparatus equipped with a means for controlling the liquid crystal layer temperature to a temperature of ($T_{CA}-10$) °C. or below.

More specifically, the apparatus shown in FIG. 9 is provided with a heating means for controlling the temperature of a ferroelectric liquid crystal 1001 at a temperature of ($T_{CA}-10$) °C. or below, e.g., at 50° C. The heating means may comprise a heat-generating resistor 1002 which may be disposed as shown (with an insulating member (not shown)) or can be disposed (not shown) in contact with the ferroelectric liquid crystal 1001, and also a power supply 1003 for supplying a current to the heat-generating resistor. The heat-generating resistor may be in the form of a transparent film of a transparent metal oxide, such as indium oxide, tin oxide or titanium oxide.

In the present invention, the liquid crystal temperature is raised by heat-generation from the resistor 1002 to a temperature $T_a$ which is higher than an operation temperature T °C. but lower than ($T_{CA}-10$) °C. and then lowered by natural cooling to T °C. This control may be effected by means of a thermistor 1005 as a temperature sensor, a current regulator 1004, a temperature control circuit 1007 and a microprocessor 1006.

In the apparatus shown in FIG. 9, signals are selectively supplied to electrodes 1009 and 1010 in the cell form a liquid crystal drive circuit 1017 whereby the orientation state of the ferroelectric liquid crystal 1001 is selectively controlled to open or close a light path therethrough. The modulation by the change in orientation state is detected by polarizers 1015 and 1016 disposed on both sides of the cell. The cell structure itself is similar to one shown in FIG. 1 and comprises substrates 1011 and 1012 of, e.g., glass or plastic sheets and alignment control films 1013 and 1014 formed from insulating materials, such as SiO, $SiO_2$, polyimide, polycarbonate and polyamide.

Figure 10:
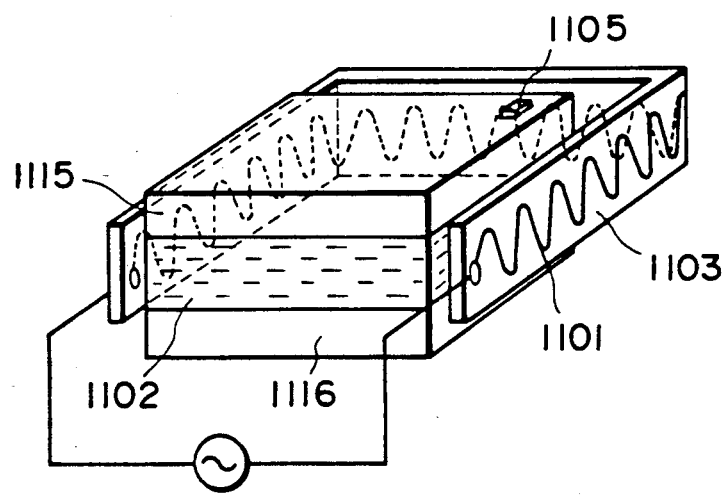
FIG. 10 is a perspective view of another embodiment of the liquid crystal device according to the invention.

FIG. 10 shows another embodiment of the apparatus according to the present invention. In this embodiment, a heating member 1103 comprising a heat-resistance body arranged with a resistance heating element 1101 is disposed on a side of a liquid crystal cell 1102. The current supplied to the resistance heating element 1101 may be controlled by a sequence as disclosed, e.g., in U.S. Pat. No. 4,763,992.

In the examples shown below, the spontaneous polarization of a ferroelectric liquid crystal material was measured by "Direct Method with Triangular Waves for Measuring Spontaneous Polarization in Ferroelectric Liquid Crystal", as described by K. Miyasato, et al (Jap. J. Appl. Phys. 22, No. 10, L661 (1983)).

EXAMPLE 1

A liquid crystal composition 1-A was prepared by mixing the following two mesomorphic compounds each having a large spontaneous polarization in an indicated ratio.

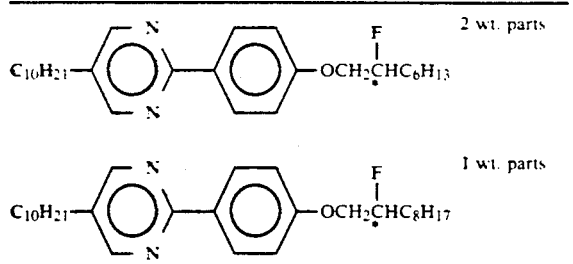

|  |  | 2 wt. parts |
|---|---|---|
| $C_{10}H_{21}$-(ring)-(ring)-$OCH_2\overset{*}{C}HC_6H_{13}$ with F | | |
| $C_{10}H_{21}$-(ring)-(ring)-$OCH_2\overset{*}{C}HC_8H_{17}$ with F | | 1 wt. parts |

Then, the above-obtained liquid crystal composition I-A was mixed with a liquid crystal composition CS-1014 (trade name, available from Chisso K.K.) in different ratios as shown in the following Table to obtain liquid crystal compositions 1-1 to 1-5, which showed $T_{CA}$ (SmC*→SmA transition temperature) also shown in the table and each of which showed a phase transition series of SmC*←→SmA←→Ch←→Iso.

| Composition | CS-1014/1-A (wt. %/wt. %) | $T_{CA}$ (°C.) |
|---|---|---|
| 1-1 | 95/5 | 54.1 |
| 1-2 | 92/8 | 53.1 |
| 1-3 | 90/10 | 52.5 |
| 1-4 | 85/15 | 51.1 |

Figure 7:
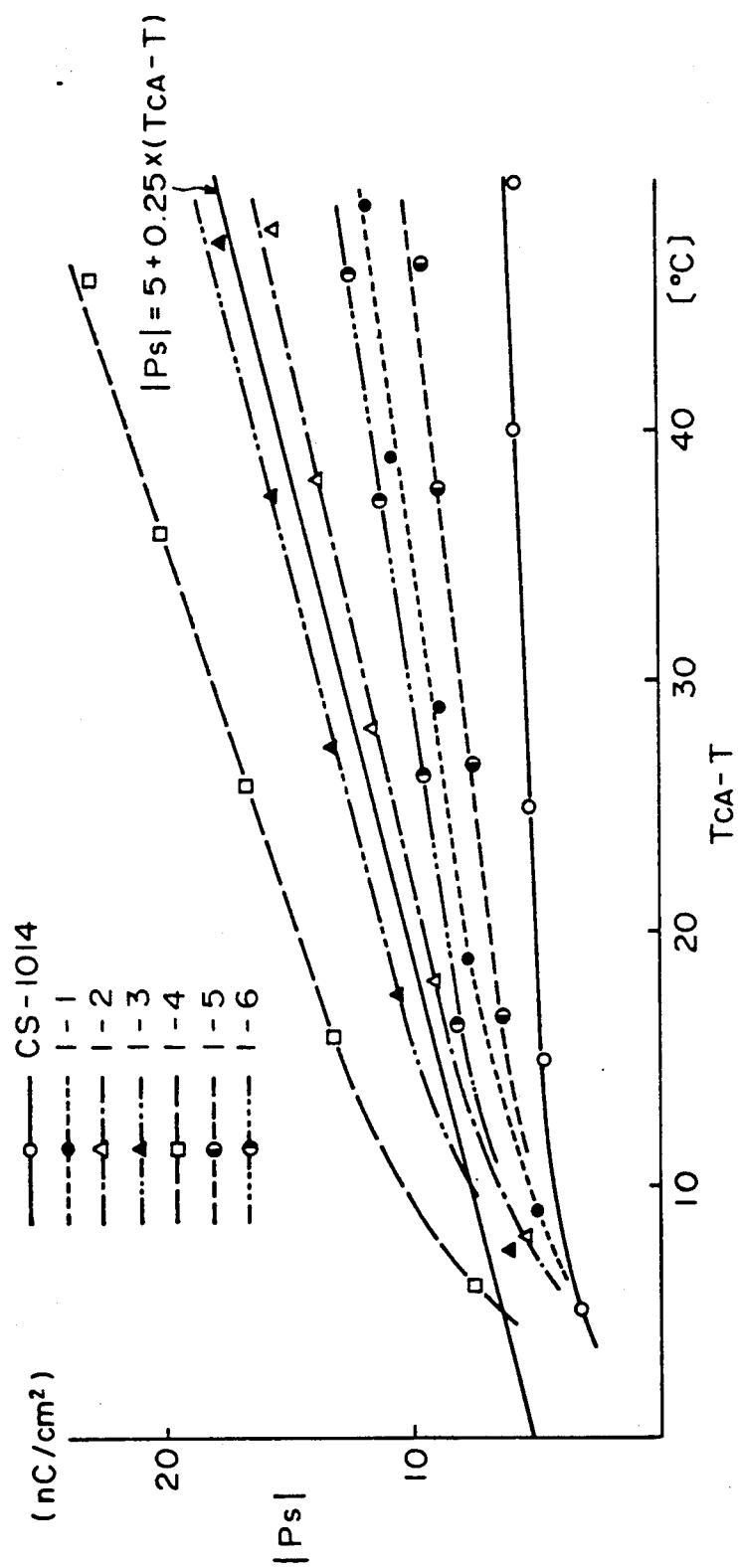
FIGS. 7, 8 and 12 are graphs showing changes in $P_S$ versus $(T_{CA} - T)$ of liquid crystal compositions used in Examples 1, 2 and Comparative Examples 1-4, respectively.

The spontaneous polarizations $P_S$ of these liquid crystal composition and CS-1014 were measured at different temperatures by the above-mentioned triangular wave method. The results are shown in FIG. 7 with respect to temperatures T (°C.) expressed in terms of $T_{CA}-T$ (°C.). As shown in FIG. 7, the increase in $P_S$ is linear with respect to $T_{CA}-T$ in the temperature range of $T_{CA}-T \geq 15°$ C. and is decreased somewhat sharply on the higher temperature side. (The $P_S$ of CS-1014 does not substantially increase in a lower temperature region. It can be concluded that no material shows an abrupt increase in $P_S$ in a low temperature region unless it is accompanied with a phase transition.) The values of $|P_S|$ of the respective liquid crystal compositions may be expressed as a function of ($T_{CA}-T$), i.e., by an equation of $|P_S| = \alpha + \beta(T_{CA}-T)$ [nC/cm²]. The values of $\alpha$ and $\beta$ for the liquid crystal compositions 1-1 to 1-5 and CS-1014 taken from FIG. 7 are shown below.

|  | α | β |
|---|---|---|
| 1-1 | 4.8 | 0.14 |
| 1-2 | 4.6 | 0.23 |
| 1-3 | 5.8 | 0.25 |
| 1-4 | 7.5 | 0.34 |
| CS-1014 | 3.8 | 0.05 |

Ferroelectric crystal devices (cells) were prepared by using the above-mentioned liquid crystal compositions and a blank cell prepared in the following manner, and then subjected to observation of the optical response.

Two 1.1 mm-thick glass plates were provided and respectively coated with an ITO film to form stripe electrodes for voltage application, which was further coated with a 400 Å-thick insulating layer of vapor-deposited $SiO_2$.

Further, each glass plate provided with ITO electrodes and an insulating layer was coated with 1.0%-solution of polyimide resin precursor (SP-510, available from Toray K.K.) in dimethylacetoamide by a spinner coater rotating at 3000 rpm for 15 seconds. Thereafter, the coating film was subjected to heat curing at 300° C. for 60 min. to obtain about 120 Å-thick film. The coating film was rubbed with acetate fiber-planted cloth. The thus treated two glass plates were washed with isopropyl alcohol. After silica beads with an average particle size of 1.5 microns were dispersed on one of the glass plates, the two glass plates were applied to each other with a bonding sealing agent (Lixon Bond available from Chisso K.K.) so that their rubbed directions were parallel to each other and heated at 100° C. for 60 min. to form a blank cell. Thus, five liquid crystal devices were prepared. The cell gap of each cell was found to be about 1.5 microns as measured by a Berek compensator.

Then, one of the above-prepared liquid crystal Compositions 1-1 to 1-4 and CS-1014 was heated into an isotropic liquid, and injected into the above prepared cell under vacuum and, after sealing, was gradually cooled to 25° C. at a rate of 20° C./hour to prepare a ferroelectric liquid crystal device.

Thus, five liquid crystal devices were prepared.

Each of the ferroelectric liquid crystal devices thus prepared was driven by using a set of driving waveforms (⅓ bias) as shown in FIGS. 4A and 4B while fixing Δt to 40 μsec, whereby the drive voltage margin Md was measured. The results are shown below.

|  | 25° C. $V_A/V_B$ (Md) | 40° C. $V_A/V_B$ (Md) |
|---|---|---|
| CS-1014 | >45 V/—*1 *2 | 19.2 V/28.8 V (0.200) |
| 1-1 | 32.5 V/>45 V *2 | 14.5 V/21.4 V (0.192) |
| 1-2 | 22.6 V/30.5 V (0.149) | 10.1 V/13.1 V (0.130) |
| 1-3 | 18.8 V/20.3 V (0.038) | 8.8 V/8.9 V (0.005) |
| 1-4 | switching failure | switching failure |

*[1]Not measured (>50 volts)
*[2]Not obtained

As is understood from the above Table, the device using the composition 1-2 alone could be driven below 30 V even at 25° C. and showed an Md exceeding 0.1.

As for the liquid crystal compositions having a $P_S$ not satisfying (exceeding) the relationship of $|P_S| < 5 + 0.25 (T_{CA}-T)$, Composition 1-3 provided a remarkably small Md, and Composition 1-4 caused switching failure due to loss of bistability, thus providing no Md.

Further, the devices containing Compositions 1-1 and 1-2 were subjected to the same measurement at 45° C., whereby Composition 1-1 provided an Md value of 0.08 and Composition 1-2 provided an Md value of 0.03, which cannot be recognized as sufficient. This is presumably because T=45° C. falled within a temperature region of $T_{CA}-T < 10°$ C.

Then, a liquid crystal composition 1-B was prepared by mixing the following two mesomorphic compounds in an indicated ratio for the purpose of providing an increased $T_{CA}$:

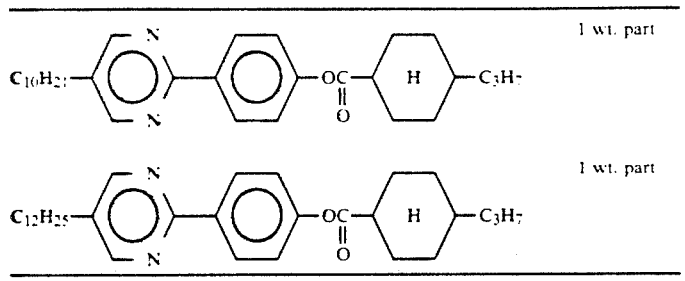

The improvement of the above compositions 1-1 and 1-2 was tried by mixing the compositions CS-1014, 1-A and 1-B as follows:

| Composition | CS-1014 (wt. %) | 1-A (wt. %) | 1-B (wt. %) |
|---|---|---|---|
| 1-5 | 80 | 5 | 15 |
| 1-6 | 77 | 8 | 15 |

The resultant compositions 1-5 and 1-6 respectively showed a phase transition series of SmC*→SmA→Ch→Iso. and $T_{CA}$ values of 61.8° C. (1-5) and 61.3° C. (1-6). The temperature-dependence of $P_S$ for these compositions is also shown in FIG. 7.

Two ferroelectric liquid crystal devices were prepared in the same manner as above except for using the compositions 1-5 and 1-6, respectively, and measurement of drive margins Md ($\Delta t$ being fixed at 40 μsec), whereby the following results were obtained:

|  | 25° C. $V_A/V_B$ (Md) | 40° C. $V_A/V_B$ (Md) | 45° C. $V_A/V_B$ (Md) |
|---|---|---|---|
| 1-5 | 33.4 V/>45 V (—) | 15.8 V/24.0 V (0.206) | 12.0 V/17.6 V (0.194) |
| 1-6 | 23.1 V/32.4 V (0.166) | 11.6 V/15.5 V (0.144) | 8.7 V/11.4 V (0.134) |

When the results obtained by Compositions 1-5 and 1-6 are compared with those obtained by Compositions 1-1 and 1-2, respectively, the values of $V_A$ (as a measure of a switching speed) at 25° C. were not changed substantially but the drive margins Md at 45° C. were remarkably increased. Further, the drive temperature margins Mt of Compositions 1-2 and 1-6 were ±2.5° C. and ±3.3° C., respectively, and thus Composition 1-6 provided an improved value.

EXAMPLE 2

Liquid crystal compositions 2-A, 2-B, 2-C and 2-D as shown below were prepared by mixing the following mesomorphic compounds in respectively indicated proportions:

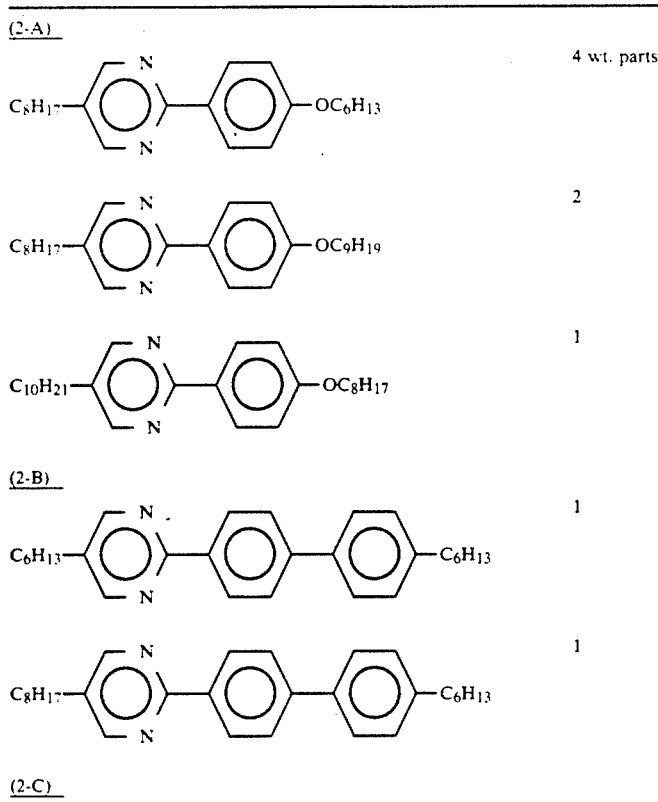

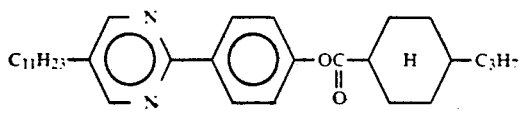

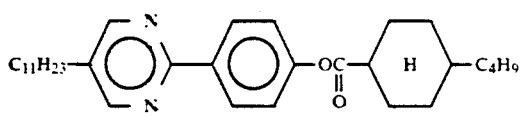

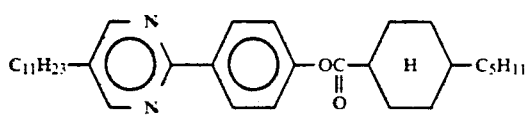

(2-D)

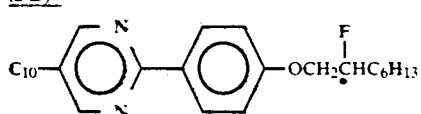

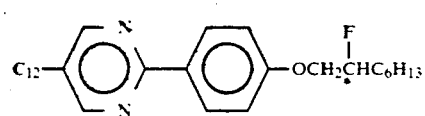

These liquid crystal compositions and other mesomorphic compounds were mixed with each other in respectively indicated weight parts to prepare liquid crystal compositions 2-1 to 2-5 as shown below:

|     | 2-1 | 2-2 | 2-3 | 2-4 | 2-5 |
| --- | --- | --- | --- | --- | --- |
| 2-A | 80  | 70  | 55  | 51.9 | 48.8 |
| 2-B | 0   | 0   | 10  | 9.5 | 8.9 |
| 2-C | 0   | 10  | 10  | 9.5 | 8.9 |
| 2-D | 10  | 10  | 10  | 15  | 20  |
| *1  | 10  | 10  | 10  | 9.5 | 8.9 |
| *2  | 0   | 0   | 5   | 4.7 | 4.5 |

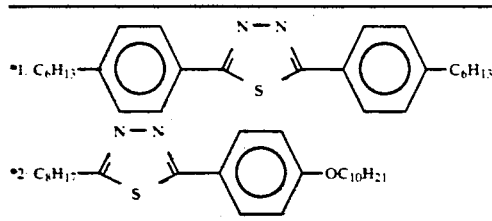

Figure 8:
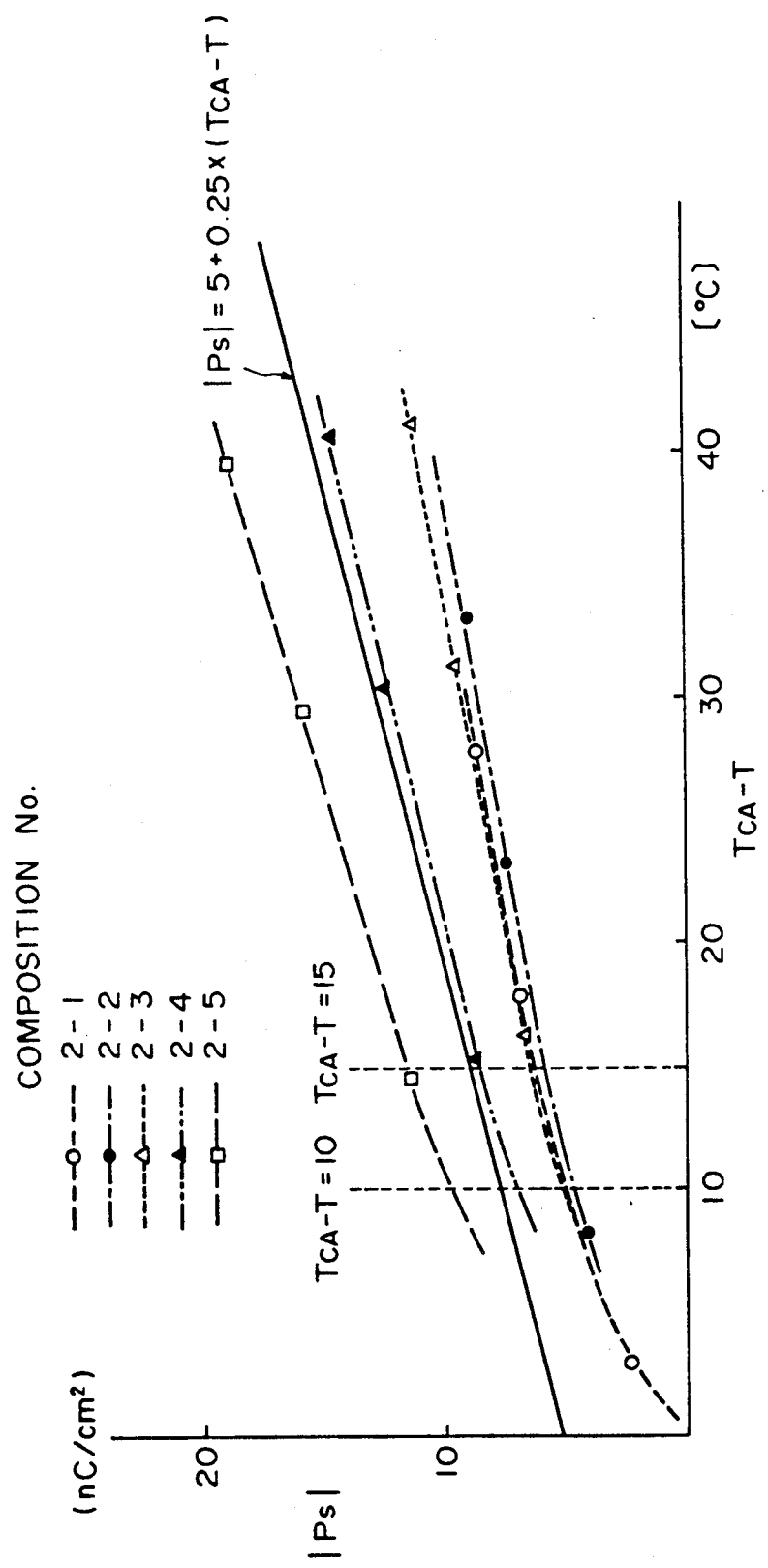

These liquid crystal compositions 2-1 to 2-5 all showed a phase transition series of SmC*←→SmA←→Ch←→Iso and $T_{CA}$ values of 57.8° C., 63.2° C., 71.4° C., 70.6° C. and 69.6° C., respectively, in the order indicated. The changes in $P_S$ dependent on temperature change are shown in FIG. 8.

Five ferroelectric liquid crystal devices were prepared in the same manner as above except for using the compositions 2-1 to 2-5, respectively, and subjected to measurement of drive margins Md in the same manner as above except for using a fixed Δt of 30 μsec., whereby the following results were obtained.

|     | 30° C. $V_A/V_B$ (Md) | 40° C. $V_A/V_B$ (Md) | 55° C. $V_A/V_B$ (Md) |
| --- | --- | --- | --- |
| 2-1 | 22.7 V/32.9 V (0.184) | 13.9 V/18.7 V (0.147) | No margin* |
| 2-2 | 24.5 V/36.7 V (0.199) | 16.3 V/23.5 V (0.183) | 8.9 V/10.1 V (0.063) |
| 2-3 | 25.8 V/40.8 V (0.225) | 17.2 V/26.0 V (0.204) | 10.1 V/14.7 V (0.185) |
| 2-4 | 19.5 V/26.0 V (0.143) | 13.1 V/17.2 V (0.135) | 7.7 V/9.8 V (0.120) |
| 2-5 | 13.1 V/13.5 V (0.015) | 8.8 V/8.9 V (0.005) | No margin |

*$V_A > V_B$

Composition 2-5 showing $P_S$ not satisfying the relationship of $|P_S|<5+0.25(T_{CA}-T)$ provided an extremely low drive margin or failed to show a drive margin. Further, Compositions 2-1 and 2-2 not having a $T_{CA}$ which is higher than 55° C. by 10° C. or larger showed a small drive margin Md or failed to show a drive margin, so that they provided a problem with respect to its upper limit temperature in the operation temperature range.

Compositions 2-3 and 2-4 having $P_S$ satisfying the relationship of $|P_S|<5+0.25(T_{CA}-T)$ and having $T_{CA}$ higher than 65° C. (=55°+10° C.) showed sufficient drive margins at 55° C. and also could be driven below 30 V at 30° C., thus being highly practical.

EXAMPLE 3

Ferroelectric liquid crystal devices were prepared by using the liquid crystal compositions CS-1014, 1-1, 1-2, 1-3, 1-4, 1-5 and 1-6, respectively, in the same manner as in Example 1 except that each cell was prepared by omitting the SiO$_2$ insulating layer to use the alignment control film of polyimide resin alone. The devices were subjected to measurement of drive margins Md in the same manner as in Example 1, whereby the device using Composition 1-4 was free from switching failure but only the devices using Compositions 1-5 and 1-6 were ensured with a drive margin Md even at a high temperature. The other tendencies were also similar to those observed in Example 1.

EXAMPLE 4

Figure 11:
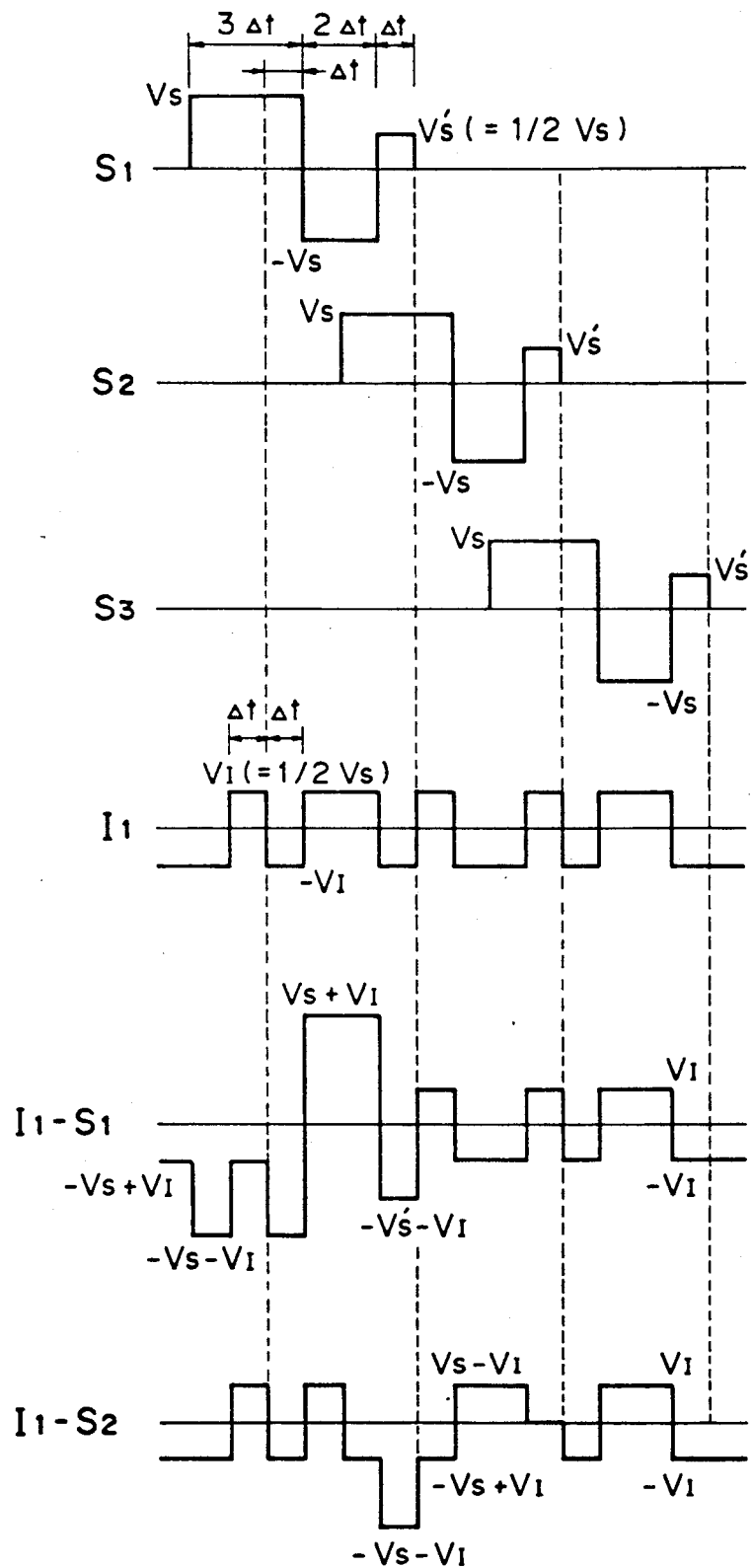
FIG. 11 is a waveform diagram showing a set of drive waveforms used in Example 4.

The ferroelectric liquid crystal devices prepared in Example 2 were driven and subjected to measurement of drive margins Md by using a set of driving waveforms shown in FIG. 11 (whereby two scanning lines were scanned simultaneously for a period of ⅓.1H so that the frame frequency of the device could be increased to 1.5 times as compared with a case without such simultaneous scanning). As a result, only the devices using Compositions 2-3 and 2-4 could be driven at a temperature of 50° C. or higher. The other tendencies were similar to those observed in Example 2.

COMPARATIVE EXAMPLES 1–4

Four ferroelectric liquid crystal devices of Comparative Examples 1–4 were prepared in the same manner as in Example 1 except that ferroelectric liquid crystal compositions CS-1017 ($T_{CA}=53°$ C.), CS-1019 ($T_{CA}=67.2°$ C.) [available from Chisso K.K.], and ZLI-4000 ($T_{CA}=63.8°$ C.), ZLI-4003 ($T_{CA}=62.0°$ C.) [available from Merck Japan K.K.] were used respectively instead of those used in Example 1. These devices were subjected to measurement of drive margins Md in the same manner as in Example 1 with a fixed $\Delta t$ of 30 μsec.

Figure 12:
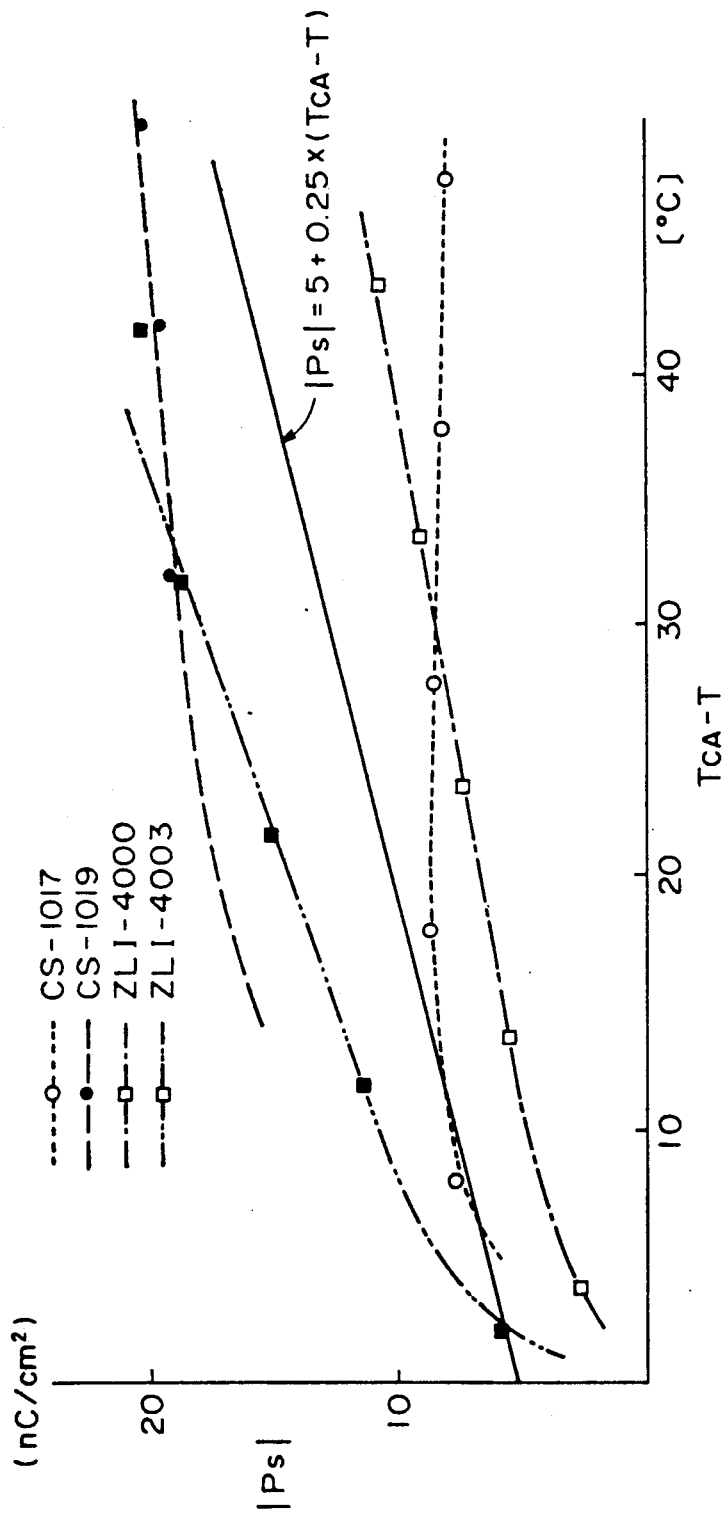

The results are shown below. Incidentally, these compositions all show a phase transition series of SmC*→SmA→Ch→Iso, and the measured spontaneous polarization data thereof are shown in FIG. 12.

|  | 25° C. $V_A/V_B$ (Md) | 40° C. $V_A/V_B$ (Md) | 55° C. $V_A/V_B$ (Md) |
|---|---|---|---|
| CS-1017 | 40.0 V/>45 V (—) | 17.0 V/20.9 V (0.103) | — |
| ZLI-4000 | 35.2 V/>45 V (—) | 16.2 V/20.3 V (0.112) | 8.5 V/0.3 V (0.019) |

The devices using the compositions CS-1019 and ZLI-4003 failed to provide any drive margin Md.

The above data show that also the compositions CS-1017 and ZLI-4000 poses a serious problem in drive margin Md at a high temperature.

EXAMPLE 5

A liquid crystal composition 5-1 was prepared by mixing the following mesomorphic compounds (1)–(17) in respectively indicated proportions:

(1) 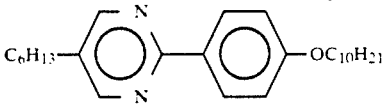 6 wt. parts (2) 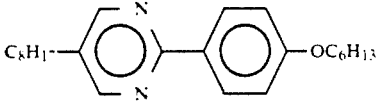 3

(3) 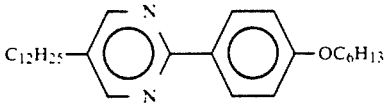 9

(4) 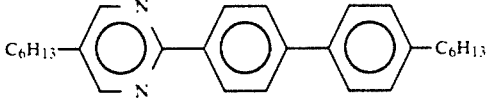 4

(5)  4

(6) 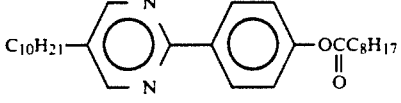 4

(7) 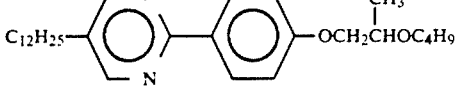 8

(8) 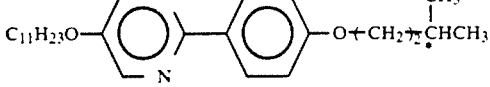 6

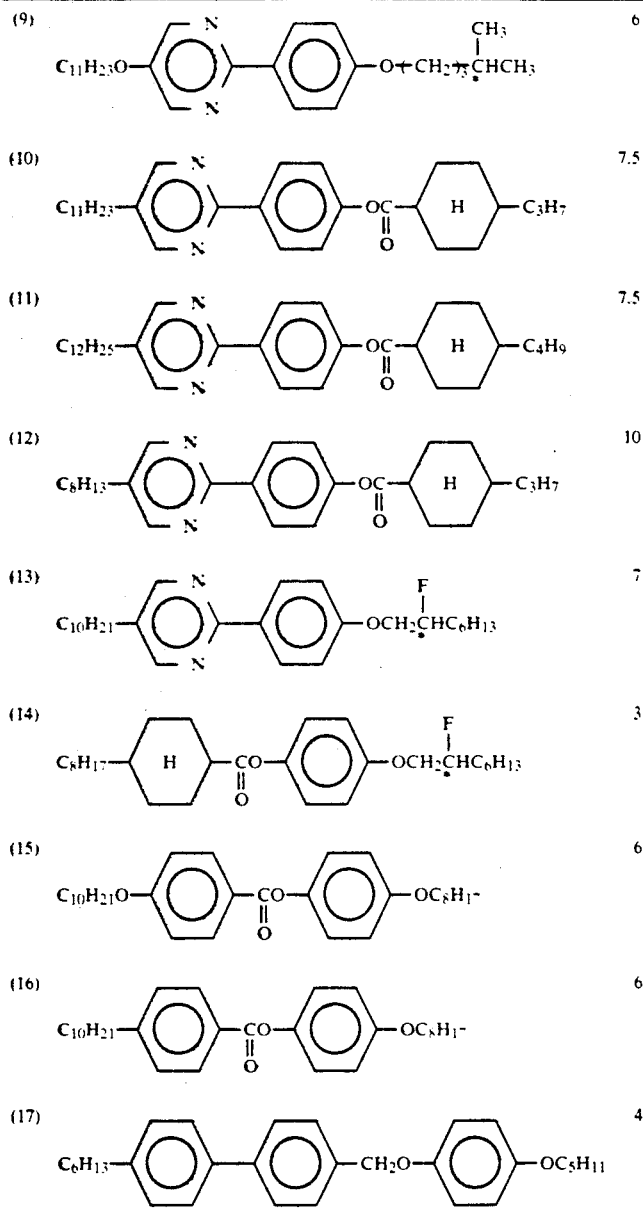

The liquid crystal composition 5-1 showed a phase transition series of SmC*⟵⟶SmA⟵⟶Ch⟵⟶Iso and $T_{CA}$ of 68.1° C. The composition also showed the following values of $P_S$ at various temperatures (T °C.) in terms of $T_{CA}-T$:

| $\|P_S\|$ (nC/cm²) ($T_{CA}$-T =) | (10° C.) | (20° C.) | (30° C.) | (40° C.) |
|---|---|---|---|---|
| | 3.9 | 6.2 | 8.5 | 11.0 |

A ferroelectric liquid crystal device was prepared by using the above composition 5-1 otherwise in the same manner as in Example 1 and subjected to measurement of drive margins Md in the same manner as in Example 1 with a fixed $\Delta t = 30$ μsec. The results are shown below:

| 25° C. $V_A/V_B$ (Md) | 40° C. $V_A/V_B$ (Md) | 55° C. $V_A/V_B$ (Md) |
|---|---|---|
| 29.4 V/45.5 V (0.215) | 17.3 V/26.3 V (0.206) | 9.8 V/13.2 V (0.148) |

The ferroelectric liquid crystal device could display good images even at 50° C. or higher.

EXAMPLE 6

A liquid crystal composition 6-1 was prepared in the same manner as the liquid crystal composition 5-1 prepared in Example 5 except that the mesomorphic compounds (13) and (14) were replaced by the following mesomorphic compounds, respectively, in the same amounts.

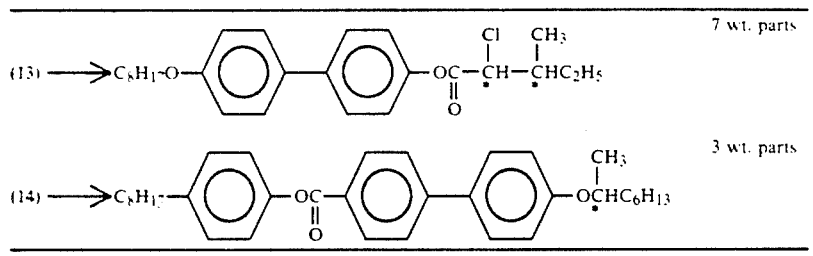

The composition 6-1 showed a phase transition series of SmC*←→SmA←→Ch←→Iso and $T_{CA}$ of 68.9° C. The $P_S$ values of the composition at different temperatures in terms of $T_{CA}-T$ (°C.) are shown below:

| $\|P_S\|$ (nC/cm²) ($T_{CA}-T=$) | (10° C.) | (20° C.) | (30° C.) | (40° C.) |
|---|---|---|---|---|
| | 4.1 | 6.3 | 8.9 | 11.2 |

A ferroelectric liquid crystal device was prepared by using the above composition 6-1 otherwise in the same manner as in Example 1 and subjected to measurement of drive margins Md in the same manner as in Example 1 with a fixed $\Delta t = 30$ μsec. The results are shown below:

| 25° C. $V_A/V_B$ (Md) | 40° C. $V_A/V_B$ (Md) | 55° C. $V_A/V_B$ (Md) |
|---|---|---|
| 32.1 V/48.1 V (0.199) | 18.1 V/26.3 V (0.185) | 10.3 V/13.6 V (0.138) |

The ferroelectric liquid crystal device could display good images even at 50° C. or higher.

As is clear from the above description, the ferroelectric liquid crystal apparatus using the ferroelectric liquid crystal composition according to the present invention can provide a display device with a large display area which shows a good rewriting speed and provides uniform and good images over a wide temperature range from approximately room temperature to a high temperature of 50° C. or higher.

As another effect of the present invention, there is provided a larger latitude with respect to fluctuation in electrode gap and temperature distribution while providing uniformly good images at a good rewriting speed.

What is claimed is:

1. A liquid crystal apparatus, comprising:

a liquid crystal cell comprising a pair of substrates having thereon a first electrode and a second electrode, respectively, disposed opposite to each other, and a chiral smectic liquid crystal showing a first orientation state and a second orientation state disposed between the first and second electrodes; and a drive circuit for applying voltages between the first and second electrodes including voltages $|V_S|$ and $|V_I|$ which provide voltages $V_A$ and $V_B$ where $V_B > V_A$ and satisfying the relationship of:

$$|(V_A - V_B)/(V_A + V_B)| > 0.1$$

at 40° C., wherein $V_A$ is a minimum peak value of a voltage $|V_S| + |V_I|$, at a constant pulse width, capable of inverting the first orientation state of the chiral smectic liquid crystal into the second orientation state when a voltage pulse is applied between the first and second electrodes to cause the first orientation state of the chiral smectic liquid crystal and then the voltage $|V_S| + |V_I|$ is applied between the first and second electrodes as a combination of a voltage $|V_S|$ applied to the first electrode and a voltage $-|V_I|$ applied to the second electrode; and $V_B$ is a value of $|V_S| + |V_I|$ calculated based on a maximum peak value of a voltage $|V_S| - |V_I|$, at a constant pulse width, capable of maintaining the first orientation state of the chiral smectic liquid crystal when a voltage pulse is applied between the first and second electrodes to cause the first orientation state and then the voltage $|V_S| - |V_I|$ is applied between the first and second electrodes as a combination of a voltage $|V_S|$ applied to the first electrode and a voltage $|V_I|$ applied to the second electrode.

2. An apparatus according to claim 1, wherein said chiral smectic liquid crystal has a spontaneous polarization $P_S[nC/cm^2]$ satisfying the relationship of:

$$|P_S| \leq 5 + 0.25(T_{CA} - T) \text{ [nC/cm}^2\text{]}$$

at an arbitrary temperature T [°C.] of $(T_{CA} - 10)$ [°C.] or below within the temperature region of chiral smectic C phase wherein $T_{CA}$ denotes the phase transition temperature from chiral smectic C phase to smectic A phase on temperature increase.

3. An apparatus according to claim 1, wherein said chiral smectic liquid crystal is in chiral smectic phase formed through cholesteric phase and smectic A phase on temperature decrease.

4. An apparatus according to claim 1, wherein said first and second electrodes are respectively covered with a dielectric film.

5. An apparatus according to claim 1, wherein said first electrode is one of a plurality of scanning electrodes receiving the voltage $|V_S|$, and said second electrode is one of a plurality of data electrodes receiving the voltage $|V_I|$.

6. A liquid crystal apparatus, comprising:

a liquid crystal cell comprising a pair of substrates having thereon a first electrode and a second electrode, respectively, disposed opposite to each other, and a chiral smectic liquid crystal showing a first orientation state and a second orientation state disposed between the first and second electrodes; and a drive circuit for applying voltages between the first and second electrodes including voltages $|V_S|$ and $|V_I|$ which provide voltages $V_A$ and $V_B$ where $V_B > V_A$ and satisfying the relationship of:

$$(V_A - V_B)/(V_A - V_B) > 0.1$$

at 55° C., wherein $V_A$ is a minimum peak value of a voltage $|V_S| + |V_I|$, at a constant pulse width, capable of inverting the first orientation state of the chiral smectic liquid crystal into the second orientation state when a voltage pulse is applied between the first and second electrodes to cause the first orientation state of the chiral smectic liquid crystal and then the voltage $|V_S| + |V_I|$ is applied between the first and second electrodes as a combination of a voltage $|V_S|$ applied to the first electrode and a voltage $-|V_I|$ applied to the second electrode; and $V_B$ is a value of $|V_S| + |V_I|$ calculated based on a maximum peak value of a voltage $|V_S| - |V_I|$, at a constant pulse width, capable of maintaining the first orientation state of the chiral smectic liquid crystal when a voltage pulse is applied between the first and second electrodes to cause the first orientation state and then the voltage $|V_S| - |V_I|$ is applied between the first and second electrodes as a combination of a voltage $|V_S|$ applied to the first electrode and a voltage $|V_I|$ applied to the second electrode.

7. An apparatus according to claim 6, wherein said chiral smectic liquid crystal is in chiral smectic phase formed through cholesteric phase and smectic A phase on temperature decrease.

8. An apparatus according to claim 6, wherein said first and second electrodes are respectively covered with a dielectric film.

9. An apparatus according to claim 6, which further comprises a heating means arranged on an outer side of the liquid crystal.

10. An apparatus according to claim 6, wherein said first electrode is one of a plurality of scanning electrodes receiving the voltage $|V_S|$, and said second electrode is one of a plurality of data electrodes receiving the voltage $|V_I|$.

11. An apparatus according to claim 10, wherein said chiral smectic liquid crystal has a spontaneous polarization $P_S[nC/cm^2]$ satisfying the relationship of:

$$|P_S| \leq 5 + 0.25(T_{CA} - T) \,[nC/cm^2]$$

at an arbitrary temperature T [°C.] of $(T_{CA} - 10)$ [°C.] or below within the temperature region of chiral smectic C phase wherein $T_{CA}$ denotes the phase transition temperature from chiral smectic C phase to smectic A phase on temperature increase.

12. A liquid crystal apparatus, comprising:

a liquid crystal cell comprising a pair of substrates having thereon scanning electrodes and data electrodes, respectively, disposed opposite to each other, and a chiral smectic liquid crystal showing a first orientation state and a second orientation state disposed between the scanning electrodes and data electrodes; and a drive means for applying a scanning selection signal including a voltage $|V_S|$ to the scanning electrodes and applying data signals including a voltage $|V_I|$ to the data electrodes in synchronism with the scanning selection signal, the voltages $|V_S|$ and $|V_I|$ providing voltages $V_A$ and $V_B$ where $V_B > V_A$ and satisfying the relationship of:

$$(V_A - V_B)/(V_A - V_B) > 0.1$$

at 40° C., wherein $V_A$ is a minimum peak value of a voltage $|V_S| + |V_I|$, at a constant pulse width, capable of inverting the first orientation state of the chiral smectic liquid crystal into the second orientation state when a voltage pulse is applied between a scanning electrode and a data electrode to cause the first orientation state of the chiral smectic liquid crystal and then the voltage $V_S + V_I$ $|V_S| + |V_I|$ is applied between the scanning and data electrodes as a combination of a voltage $|V_S|$ applied to the scanning electrode and voltage $-|V_I|$ applied to the data electrode; and $V_B$ is a value of $|V_S| + |V_I|$ calculated based on a maximum peak value of a voltage $|V_S| - |V_I|$, at a constant pulse width, capable of maintaining the first orientation state of the chiral smectic liquid crystal when a voltage pulse is applied between a scanning electrode and a data electrode to cause the first orientation state and then the voltage $|V_S| - |V_I|$ is applied between the scanning and data electrodes as a combination of a voltage $|V_S|$ applied to the scanning electrode and a voltage $|V_I|$ applied to the data electrode.

13. An apparatus according to claim 12, wherein said drive circuit includes means for applying a voltage for simultaneously resetting pixels on a selected scanning electrode into one optical state and then applying a reverse-polarity voltage of a polarity opposite to that of the voltage for resetting to a selected pixel among the pixels on the selected scanning electrode.

14. An apparatus according to claim 13, wherein said drive circuit includes means for, while said reverse polarity voltage is applied to the selected pixel on the selected scanning electrode, applying a voltage for simultaneously resetting pixels on a subsequently selected scanning electrode into one optical state.

15. An apparatus according to claim 12, wherein said chiral smectic liquid crystal has a spontaneous polarization $P_S[nC/cm^2]$ satisfying the relationship of:

$$|P_S| \leq 5 + 0.25(T_{CA} - T) \,[nC/cm^2]$$

at an arbitrary temperature T [°C.] of $(T_{CA} - 10)$ [°C.] or below within the temperature region of chiral smectic C phase wherein $T_{CA}$ denotes the phase transition temperature from chiral smectic C phase to smectic A phase on temperature increase.

16. An apparatus according to claim 12, wherein said chiral smectic liquid crystal is in chiral smectic phase formed through cholesteric phase and smectic A phase on temperature decrease.

17. An apparatus according to claim 12, wherein said scanning electrodes and data electrodes are respectively covered with a dielectric film.

18. An apparatus according to claim 12, wherein said drive circuit includes means for applying an AC voltage to the pixels at the time of non-selection.

19. A liquid crystal apparatus, comprising:

a liquid crystal cell comprising a pair of substrates having thereon scanning electrodes and data electrodes, respectively, disposed opposite to each other, and a chiral smectic liquid crystal showing a first orientation state and a second orientation state disposed between the scanning electrodes and data electrodes; and a drive means for applying a scanning selection signal including a voltage $|V_S|$ to the scanning electrodes and applying data signals including a voltage $|V_I|$ to the data electrodes in synchronism with the scanning selection signal, the voltages $|V_S|$ and $|V_I|$ providing voltages $V_A$ and $V_B$ where $V_B > V_A$ and satisfying the relationship of:

$$|(V_A - V_B)/(V_A + V_B)| > 0.1$$

at 55° C., wherein $V_A$ is a minimum peak value of a voltage $|V_S| + |V_I|$, at a constant pulse width, capable of inverting the first orientation state of the chiral smectic liquid crystal into the second orientation state when a voltage pulse is applied between a scanning electrode and a data electrode to cause the first orientation state of the chiral smectic liquid crystal and then the voltage $|V_S| + |V_I|$ is applied between the scanning and data electrodes as a combination of a voltage $|V_S|$ applied to the scanning electrode and voltage $-|V_I|$ applied to the data electrode; and $V_B$ is a value of $|V_S| + |V_I|$ calculated based on a maximum peak value of a voltage $|V_S| - |V_I|$, at a constant pulse width, capable of maintaining the first orientation state of the chiral smectic liquid crystal when a voltage pulse is applied between a scanning electrode and a data electrode to cause the first orientation state and then the voltage $|V_S| - |V_I|$ is applied between the scanning and data electrodes as a combination of a voltage $|V_S|$ applied to the scanning electrode and a voltage $|V_I|$ applied to the data electrode.

20. An apparatus according to claim 19, wherein said drive circuit includes means for applying a voltage for simultaneously resetting pixels on a selected scanning electrode into one optical state and then applying a reverse-polarity voltage of a polarity opposite to that of the voltage for resetting to a selected pixel among the pixels on the selected scanning electrode.

21. An apparatus according to claim 20, wherein said drive circuit includes means for, while the said reverse polarity voltage is applied to the selected pixel on the selected scanning electrode, applying a voltage for simultaneously resetting pixels on a subsequently selected scanning electrode into one optical state.

22. An apparatus according to claim 19, wherein said chiral smectic liquid crystal is in chiral smectic phase formed through cholesteric phase and smectic A phase on temperature decrease.

23. An apparatus according to claim 19, wherein said scanning electrodes and data electrodes are respectively covered with a dielectric film.

24. An apparatus according to claim 19, which further comprises a heating means arranged on an outer side of the liquid crystal cell.

25. An apparatus according to claim 19, wherein said drive circuit includes means for applying an AC voltage to the pixels at the time of non-selection.

26. A liquid crystal apparatus, comprising:

a) a liquid crystal cell comprising a pair of substrates having thereon a first electrode and a second electrode, respectively, disposed opposite to each other, and a chiral smectic liquid crystal showing a first orientation state and a second orientation state disposed between the first and second electrodes, said chiral smectic liquid crystal is a composition containing a mesomorphic compound having a skeleton selected from the group consisting of:

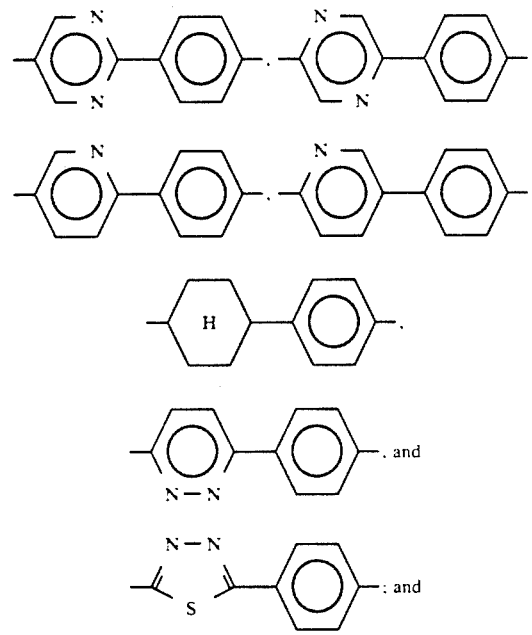

b) a drive circuit for applying voltages between said first and second electrodes including voltages $|V_S|$ and $|V_I|$ which provide voltages $V_A$ and $V_B$ where $V_B > V_A$ and satisfying the relationship of:

$$|(V_A - V_B)/(V_A + V_B)| > 0.1$$

at 40° C., wherein $V_A$ is a minimum peak value of a voltage $|V_S| + |V_I|$, at a constant pulse width, capable of inverting the first orientation state of the chiral smectic liquid crystal into the second orientation state when a voltage pulse is applied between the first and second electrodes to cause the first orientation state of the chiral smectic liquid crystal and then the voltage $|V_S| + |V_I|$ is applied between the first and second electrodes as a combination of a voltage $|V_S|$ applied to the first electrode and voltage $-|V_I|$ applied to the second electrode; and $V_B$ is a value of $|V_S| + |V_I|$ calculated based on a maximum peak value of a voltage $|V_S| - |V_I|$, at a constant pulse width, capable of maintaining the first orientation state of the chiral smectic liquid crystal when a voltage pulse is applied between the first and second electrodes to cause the first orientation state and then the voltage $|V_S| - |V_I|$ is applied between the first and second electrodes as a combination of a voltage $|V_S|$ applied to the first electrode and a voltage $|V_I|$ applied to the second electrode.

27. A liquid crystal apparatus, comprising:

a) a liquid crystal cell comprising a pair of substrates having thereon a first electrode and a second electrode, respectively, disposed opposite to each other, and a chiral smectic liquid crystal showing a first orientation state and a second orientation state disposed between the first and second electrodes, said chiral smectic liquid crystal is a composition containing a mesomorphic compound having a skeleton selected from the group consisting of:

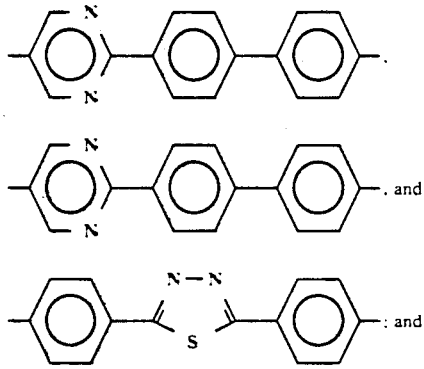

b) a drive circuit for applying voltages between the first and second electrodes including voltages $|V_S|$ and $|V_I|$ which provide voltages $V_A$ and $V_B$ where $V_B > V_A$ and satisfying the relationship of:

$|(V_A - V_B)/(V_A + V_B)| > 0.1$ at 40° C., wherein $V_A$ is a minimum peak value of a voltage $|V_S| + |V_I|$, at a constant pulse width, capable of inverting the first orientation state of the chiral smectic liquid crystal into the second orientation state when a voltage pulse is applied between the first and second electrodes to cause the first orientation state of the chiral smectic liquid crystal and then the voltage $|V_S| + |V_I|$ is applied between the first and second electrodes as a combination of a voltage $|V_S|$ applied to the first electrode and voltage $-|V_I|$ applied to the second electrode; and $V_B$ is a value of $|V_S| + |V_I|$ calculated based on a maximum peak value of a voltage $|V_S| - |V_I|$, at a constant pulse width, capable of maintaining the first orientation state of the chiral smectic liquid crystal when a voltage pulse is applied between the first and second electrodes to cause the first orientation state and then the voltage $|V_S| - |V_I|$ is applied between the first and second electrodes as a combination of a voltage $|V_S|$ applied to the first electrode and a voltage $|V_I|$ applied to the second electrode.

28. A liquid crystal apparatus, comprising:
a) a liquid crystal cell comprising a pair of substrates having thereon a first electrode and a second electrode, respectively, disposed opposite to each other, and a chiral smectic liquid crystal showing a first orientation state and a second orientation state disposed between the first and second electrodes, said chiral smectic liquid crystal is a composition containing a mesomorphic compound having a skeleton selected from the group consisting of:

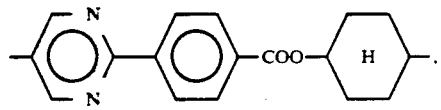

-continued

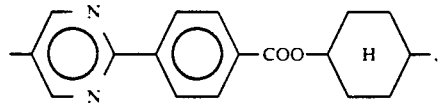

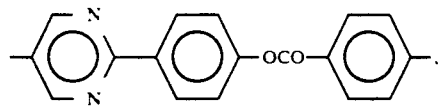

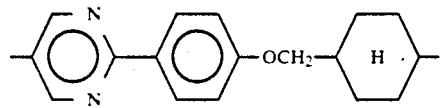

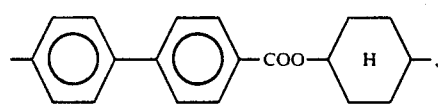

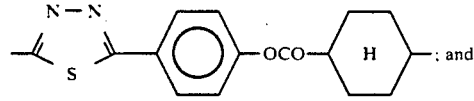

b) a drive circuit for applying voltages between the first and second electrodes including voltages $|V_S|$ and $|V_I|$ which provide voltages $V_A$ and $V_B$ where $V_B > V_A$ and satisfying the relationship of:

$|(V_A - V_B)/(V_A + V_B)| > 0.1$ at 40° C., wherein $V_A$ is a minimum peak value of a voltage $|V_S| + |V_I|$, at a constant pulse width, capable of inverting the first orientation state of the chiral smectic liquid crystal into the second orientation state when a voltage pulse is applied between the first and second electrodes to cause the first orientation state of the chiral smectic liquid crystal and then the voltage $|V_S| + |V_I|$ is applied between the first and second electrodes as a combination of a voltage $|V_S|$ applied to the first electrode and voltage $-|V_I|$ applied to the second electrode; and $V_B$ is a value of $|V_S| + |V_I|$ calculated based on a maximum peak value of a voltage $|V_S| - |V_I|$, at a constant pulse width, capable of maintaining the first orientation state of the chiral smectic liquid crystal when a voltage pulse is applied between the first and second electrodes to cause the first orientation state and then the voltage $|V_S| - |V_I|$ is applied between the first and second electrodes as a combination of a voltage $|V_S|$ applied to the first electrode and a voltage $|V_I|$ applied to the second electrode.

29. A liquid crystal apparatus, comprising:
a) a liquid crystal cell comprising a pair of substrates having thereon a first electrode and a second electrode, respectively, disposed opposite to each other, and a chiral smectic liquid crystal showing a first orientation state and a second orientation state disposed between the first and second electrodes, said chiral smectic liquid crystal is a composition containing a mesomorphic compound having a skeleton selected from the group consisting of:

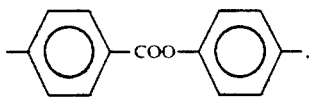

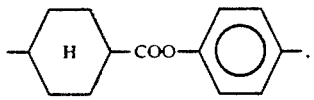

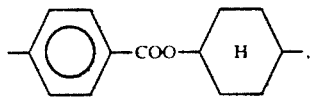

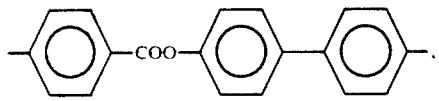

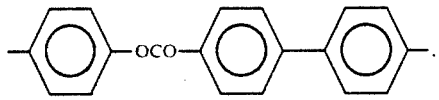

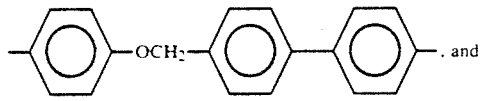, and

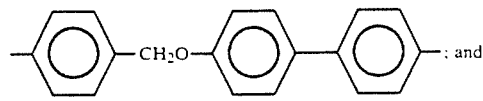; and b) a drive circuit for applying voltages between the first and second electrodes including voltages $|V_S|$ and $|V_I|$ which provide voltages $V_A$ and $V_B$ where $V_B > V_A$ and satisfying the relationship of:

$$|(V_A - V_B)/(V_A + V_B)| > 0.1$$

at 40° C., wherein $V_A$ is a minimum peak value of a voltage $|V_S| + |V_I|$, at a constant pulse width, capable of inverting the first orientation state of the chiral smectic liquid crystal into the second orientation state when a voltage pulse is applied between the first and second electrodes to cause the first orientation state of the chiral smectic liquid crystal and then the voltage $|V_S| + |V_I|$ is applied between the first and second electrodes as a combination of a voltage $|V_S|$ applied to the first electrode and voltage $-|V_I|$ applied to the second electrode; and $V_B$ is a value of $|V_S| + |V_I|$ calculated based on a maximum peak value of a voltage $|V_S| - |V_I|$, at a constant pulse width, capable of maintaining the first orientation state of the chiral smectic liquid crystal when a voltage pulse is applied between the first and second electrodes to cause the first orientation state and then the voltage $|V_S| - |V_I|$ is applied between the first and second electrodes as a combination of a voltage $|V_S|$ applied to the first electrode and a voltage $|V_I|$ applied to the second electrode.

* * * * *

UNITED STATES PATENT AND TRADEMARK OFFICE
CERTIFICATE OF CORRECTION

PATENT NO. : 5,119,219
DATED : June 2, 1992
INVENTOR(S) : MASAHIRO TERADA, ET AL.

It is certified that error appears in the above-identified patent and that said Letters Patent is hereby corrected as shown below:

IN [57] ABSTRACT

Line 6, "$V_B(V_BV_A)$" should read --$V_B(V_B>V_A)$--.
Line 17, "voltage -$V_I$|" should read --voltage - $|V_I|$--.

COLUMN 13

Line 18, "1-5," should read --1-4,--.
Line 33, "composition" should read --compositions--.
Line 49, "1-5" should read --1-4--.

COLUMN 14

Line 62, "failed" should read --fell--.

COLUMN 32

Line 9, "$V_A$and" should read --$V_A$ and--.

Signed and Sealed this

Fourteenth Day of September, 1993

Attest:

BRUCE LEHMAN

Attesting Officer     Commissioner of Patents and Trademarks